(12) United States Patent
Liljedahl

(10) Patent No.: US 11,822,815 B2
(45) Date of Patent: Nov. 21, 2023

(54) HANDLING RING BUFFER UPDATES

(71) Applicant: Arm Limited, Cambridge (GB)

(72) Inventor: Eric Ola Harald Liljedahl, Stockholm (SE)

(73) Assignee: Arm Limited, Cambridge (GB)

( * ) Notice: Subject to any disclaimer, the term of this patent is extended or adjusted under 35 U.S.C. 154(b) by 271 days.

(21) Appl. No.: 17/310,868

(22) PCT Filed: Feb. 25, 2020

(86) PCT No.: PCT/GB2020/050438
§ 371 (c)(1),
(2) Date: Aug. 27, 2021

(87) PCT Pub. No.: WO2020/178554
PCT Pub. Date: Sep. 10, 2020

(65) Prior Publication Data
US 2022/0137873 A1     May 5, 2022

(30) Foreign Application Priority Data
Mar. 1, 2019   (GB) ..................................... 1902784

(51) Int. Cl.
*G06F 3/06*     (2006.01)
*G06F 5/12*     (2006.01)

(52) U.S. Cl.
CPC .......... *G06F 3/0656* (2013.01); *G06F 3/0604* (2013.01); *G06F 3/0631* (2013.01);
(Continued)

(58) Field of Classification Search
CPC .. G06F 12/08; G06F 12/0811; G06F 12/0846; G06F 12/0246; G06F 12/02; G06F 2212/1021; G06F 3/06; G06F 3/06561; G06F 3/0659; G06F 3/0679; G06F 3/0631; G06F 3/0604
See application file for complete search history.

(56) References Cited

U.S. PATENT DOCUMENTS 7,970,927 B1   6/2011  Shao et al.
9,996,468 B1   6/2018  Shumsky et al.
(Continued)

FOREIGN PATENT DOCUMENTS

EP            0802698 A2 * 10/1997 ............. H04Q 11/04
WO       2017/151138 A1    9/2017
WO    WO-2020005448 A1 *  1/2020  ......... G06F 13/4027

*Primary Examiner* — Pierre Michel Bataille
(74) *Attorney, Agent, or Firm* — NIXON & VANDERHYE P.C.

(57) ABSTRACT

Ring buffer storage circuitry is disclosed which stores a ring buffer comprising multiple slots to hold a queued se-quence of data items. Data processing circuitry executes a plurality of processes to add one or more data items to be processed to the queued sequence and to remove one or more data items for process-ing from the queued sequence. Each process is arranged to perform an acquire process to acquire at least one slot in the ring buffer and to subsequently perform a release process to release the at least one slot. Ring buffer metadata storage circuitry stores metadata for the ring buffer comprising a first reference indicator and a second reference indicator. Corresponding methods and instructions are also disclosed.

20 Claims, 13 Drawing Sheets

(52) U.S. Cl.
CPC .......... *G06F 3/0659* (2013.01); *G06F 3/0679* (2013.01); *G06F 5/12* (2013.01)

(56) References Cited

U.S. PATENT DOCUMENTS

| | | | |
|---|---|---|---|
| 10,152,275 B1* | 12/2018 | Tsirkin | ................. G06F 3/0656 |
| 2009/0204755 A1 | 8/2009 | Rushworth et al. | |
| 2010/0312985 A1 | 12/2010 | Rostedt | |
| 2019/0087123 A1* | 3/2019 | Liljedahl | ............... G06F 3/0656 |
| 2019/0354310 A1* | 11/2019 | Tsirkin | ................... G06F 3/065 |
| 2020/0349167 A1* | 11/2020 | Jansen | ................... G06F 12/00 |
| 2020/0401520 A1* | 12/2020 | Tsirkin | ................. G06F 9/5061 |
| 2021/0318925 A1* | 10/2021 | Fusco | ................ G06F 11/3013 |
| 2022/0116334 A1* | 4/2022 | Zhu | .................... H04W 28/065 |

* cited by examiner

HANDLING RING BUFFER UPDATES

The present disclosure relates to data processing. More particularly it relates to the administration of a ring buffer in a data processing apparatus.

Various data processing contexts may generate data items to be further processed in a specific order and one mechanism by which this may be administered is to hold those generated data items in a queued sequence in a ring buffer, wherein newly generated data items are added to the tail end of the queued sequence, whilst data items are removed from the head end of the queued sequence for the further processing. This queued sequence of data items held in the ring buffer can provide a centralised store of generated data items which require further processing, to which multiple "producers" operating in the data processing system may add generated data items and from which multiple "consumers" in the data processing system may remove data items for further processing. However, this interaction of multiple producers and consumers with the ring buffer can mean that the action of one producer or consumer with respect to the content of the ring buffer can block other producers or consumers from carrying out their own interactions with the ring buffer. In a lock-based approach only one producer or consumer can access the ring buffer at a time and this can thus become a significant bottleneck in throughput. Moreover, even in "lock-less" ring buffer designs one producer or consumer can still block other producers or consumers from completing due to the constraint that they must release their updates to the ring buffer in order of ring buffer acquisition (i.e. in the order of the queued sequence of data items) in order to preserve the correct ordering of the ring buffer and of the updates that are made to it. If an earlier producer or consumer is stalled (for example in an interaction with another system component, e.g. a cache miss or being pre-empted by the operating system), then later producers or consumers must wait until the earlier producer or consumer completes. This creates both non-determinism (latencies and stalls in one thread may propagate to other threads) and also creates scalability problems (since the multiple threads are effectively passing a symbolic token between them in order to complete, and this creates a serialisation of all involved threads). Conversely, dedicating a single thread to handle the reordering results is likely to result in a single-threaded bottleneck.

In one example embodiment there is an apparatus comprising: ring buffer storage circuitry to store a ring buffer comprising multiple slots to hold a queued sequence of data items; data processing circuitry to execute a plurality of processes to add one or more data items to be processed to the queued sequence and to remove one or more data items for processing from the queued sequence, wherein each process is arranged to perform an acquire process to acquire at least one slot in the ring buffer and to subsequently perform a release process to release the at least one slot; and ring buffer metadata storage circuitry to store metadata for the ring buffer comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein the release process comprises an attempt to update the first reference indicator for the ring buffer comprising an atomic operation in which the expected slot value for the process is compared with the current slot indicator, and when the current slot indicator matches the expected slot value at least the current slot indicator is updated by modifying a value of the current slot indicator by a predetermined value, and when the current slot indicator does not match the expected slot value the pending slot indicator is updated by modifying a value of the pending slot indicator to indicate the presence and the location of one or more pending slots of the ring buffer without updating the current slot indicator.

In another example embodiment there is a method of operating data processing apparatus comprising the steps of: allocating storage for a ring buffer comprising multiple slots to hold a queued sequence of data items; executing a plurality of processes to add one or more data items to be processed to the queued sequence and to remove one or more data items for processing from the queued sequence, wherein an acquire process is performed to acquire at least one slot in the ring buffer and a release process is subsequently performed to release the at least one slot; allocating storage for metadata for the ring buffer, the metadata comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein the release process comprises attempting to update the first reference indicator for the ring buffer comprising an atomic operation in which the expected slot value for the process is compared with the current slot indicator, and when the current slot indicator matches the expected slot value at least the current slot indicator is updated by modifying a value of the current slot indicator by a predetermined value, and when the current slot indicator does not match the expected slot value the pending slot indicator is updated by modifying a value of the pending slot indicator to indicate the presence and the location of one or more pending slots of the ring buffer without updating the current slot indicator.

In another example embodiment there is an apparatus comprising: ring buffer storage circuitry to store a ring buffer comprising multiple slots to hold a queued sequence of data items; instruction decoder circuitry to decode instructions; data processing circuitry to execute a plurality of processes to add one or more data items to be processed to the queued sequence and to remove one or more data items for processing from the queued sequence, wherein each process is arranged to perform an acquire process to acquire at least one slot in the ring buffer and to subsequently perform a release process to release the at least one slot; and ring buffer metadata storage circuitry to store metadata for the ring buffer comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein the instruction decoder circuitry is responsive to a ring buffer release instruction to be executed by the data processing circuitry to control the data processing circuitry to perform the release process comprising the steps of: attempting to update the first reference indicator for the ring buffer comprising an atomic operation in which the expected slot value for the process is compared with the current slot indicator, and when the current slot indicator matches the expected slot value at least the current slot indicator is updated by modifying a value of the current slot indicator by a predetermined value, and when the current slot indicator does not match the expected slot value the pending slot indicator is updated by modifying a value of the pending slot indicator to indicate the presence and the location of one or more pending slots of the ring buffer without updating the current slot indicator.

In another example embodiment there is a computer program for controlling a host data processing apparatus to provide an instruction execution environment comprising: ring buffer storage logic to store a ring buffer comprising multiple slots to hold a queued sequence of data items; instruction decoder logic to decode instructions; data processing logic to execute a plurality of processes to add one or more data items to be processed to the queued sequence and to remove one or more data items for processing from the queued sequence, wherein each process is arranged to perform an acquire process to acquire at least one slot in the ring buffer and to subsequently perform a release process to release the at least one slot; and ring buffer metadata storage logic to store metadata for the ring buffer comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein the instruction decoder logic is responsive to a ring buffer release instruction to be executed by the data processing logic to control the data processing logic to perform the release process comprising the steps of: attempting to update the first reference indicator for the ring buffer comprising an atomic operation in which the expected slot value for the process is compared with the current slot indicator, and when the current slot indicator matches the expected slot value at least the current slot indicator is updated by modifying a value of the current slot indicator by a predetermined value, and when the current slot indicator does not match the expected slot value the pending slot indicator is updated by modifying a value of the pending slot indicator to indicate the presence and the location of one or more pending slots of the ring buffer without updating the current slot indicator.

In another example embodiment there is an apparatus comprising: ring buffer storage circuitry to store a ring buffer comprising multiple slots to hold a queued sequence of data items; data processing circuitry to execute a plurality of processes to add one or more data items to be processed to the queued sequence and to remove one or more data items for processing from the queued sequence, wherein each process is arranged to perform an acquire process to acquire at least one slot in the ring buffer; and ring buffer metadata storage circuitry to store metadata for the ring buffer comprising a first reference indicator and a second reference indicator, the first reference indicator comprising a current slot indicator indicative of a location of a current slot at one end of the queued sequence of data items and the second reference indicator comprising an expected slot indicator indicative of an expected location of a current slot at the other end of the queued sequence of data items, wherein the one end of the queued sequence of data items is either a head end or a tail end of the queued sequence of data items, wherein the acquire process comprises an attempt to update the second reference indicator for the ring buffer comprising an atomic operation in which a number of slots requested for acquisition by a process is compared with the current slot indicator and the expected slot indicator, and when the current slot indicator and the expected slot indicator indicate that one or more slots in the ring buffer are eligible for acquisition the expected slot indicator is updated by modifying a value of the expected slot indicator.

In another example embodiment there is a method of operating data processing apparatus comprising the steps of: allocating storage for a ring buffer comprising multiple slots to hold a queued sequence of data items; executing a plurality of processes to add one or more data items to be processed to the queued sequence and to remove one or more data items for processing from the queued sequence, wherein an acquire process is performed to acquire at least one slot in the ring buffer; allocating storage for metadata for the ring buffer, the metadata comprising a first reference indicator and a second reference indicator, the first reference indicator comprising a current slot indicator indicative of a location of a current slot at one end of the queued sequence of data items and the second reference indicator comprising an expected slot indicator indicative of an expected location of a current slot at the other end of the queued sequence of data items, wherein the one end of the queued sequence of data items is either a head end or a tail end of the queued sequence of data items, wherein the acquire process comprises attempting to update the second reference indicator for the ring buffer comprising an atomic operation in which a number of slots requested for acquisition by a process is compared with the current slot indicator and the expected slot indicator, and when the current slot indicator and the expected slot indicator indicate that one or more slots in the ring buffer are eligible for acquisition the expected slot indicator is updated by modifying a value of the expected slot indicator.

In another example embodiment there is an apparatus comprising: ring buffer storage circuitry to store a ring buffer comprising multiple slots to hold a queued sequence of data items; instruction decoder circuitry to decode instructions; data processing circuitry to execute a plurality of processes to add one or more data items to be processed to the queued sequence and to remove one or more data items for processing from the queued sequence, wherein each process is arranged to perform an acquire process to acquire at least one slot in the ring buffer; and ring buffer metadata storage circuitry to store metadata for the ring buffer comprising a first reference indicator and a second reference indicator, the first reference indicator comprising a current slot indicator indicative of a location of a current slot at one end of the queued sequence of data items and the second reference indicator comprising an expected slot indicator indicative of an expected location of a current slot at the other end of the queued sequence of data items, wherein the one end of the queued sequence of data items is either a head end or a tail end of the queued sequence of data items, wherein the instruction decoder circuitry is responsive to a ring buffer acquire instruction to be executed by the data processing circuitry to control the data processing circuitry to perform the acquire process comprising the steps of: attempting to update the second reference indicator for the ring buffer comprising an atomic operation in which a number of slots requested for acquisition by a process is compared with the current slot indicator and the expected slot indicator, and when the current slot indicator and the expected slot indicator indicate that one or more slots in the ring buffer are eligible for acquisition the expected slot indicator is updated by modifying a value of the expected slot indicator.

In another example embodiment there is a computer program for controlling a host data processing apparatus to provide an instruction execution environment comprising: ring buffer storage logic to store a ring buffer comprising multiple slots to hold a queued sequence of data items; instruction decoder logic to decode instructions; data processing logic to execute a plurality of processes to add one or more data items to be processed to the queued sequence and to remove one or more data items for processing from the queued sequence, wherein each process is arranged to perform an acquire process to acquire at least one slot in the ring buffer; and ring buffer metadata storage logic to store metadata for the ring buffer comprising a first reference indicator and a second reference indicator, the first reference indicator comprising a current slot indicator indicative of a location of a current slot at one end of the queued sequence of data items and the second reference indicator comprising an expected slot indicator indicative of an expected location of a current slot at the other end of the queued sequence of data items, wherein the one end of the queued sequence of data items is either a head end or a tail end of the queued sequence of data items, wherein the instruction decoder logic is responsive to a ring buffer acquire instruction to be executed by the data processing logic to control the data processing logic to perform the acquire process comprising the steps of: attempting to update the second reference indicator for the ring buffer comprising an atomic operation in which a number of slots requested for acquisition by a process is compared with the current slot indicator and the expected slot indicator, and when the current slot indicator and the expected slot indicator indicate that one or more slots in the ring buffer are eligible for acquisition the expected slot indicator is updated by modifying a value of the expected slot indicator.

The present techniques will be described further, by way of example only, with reference to embodiments thereof as illustrated in the accompanying drawings, to be read in conjunction with the following description, in which:

FIG. 1 schematically illustrates a data processing apparatus in accordance with embodiments of the present disclosure;

FIG. 2 schematically illustrates a ring buffer and the addition and removal of data items from that ring buffer by producers and consumers with reference to head and tail pointers in accordance with embodiments of the present disclosure;

FIG. 3 schematically illustrates how a producer may be blocked from releasing its updates, because a previous producer has not yet completed the release of its updates;

Figure 10:
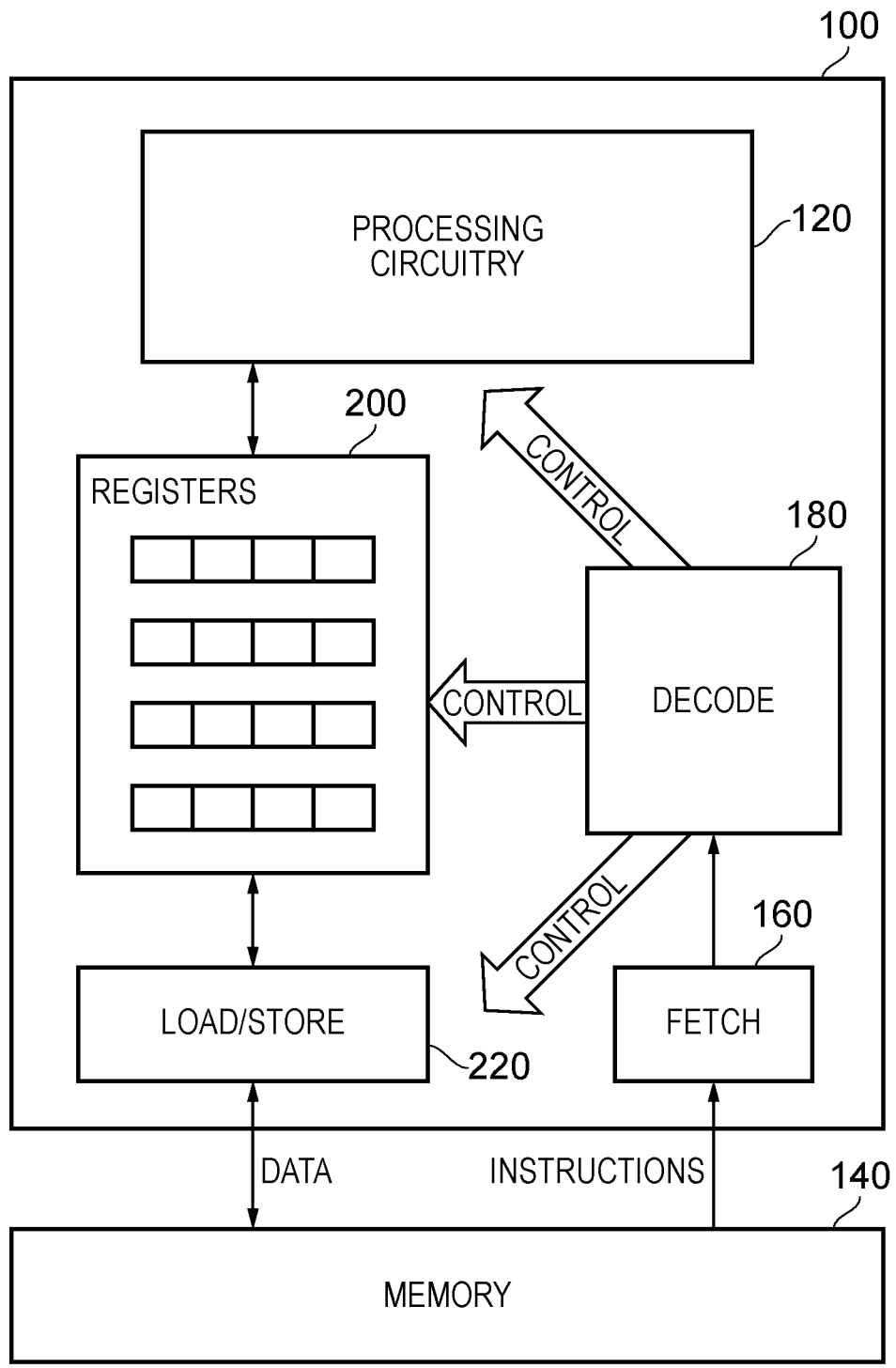
Figure 11:
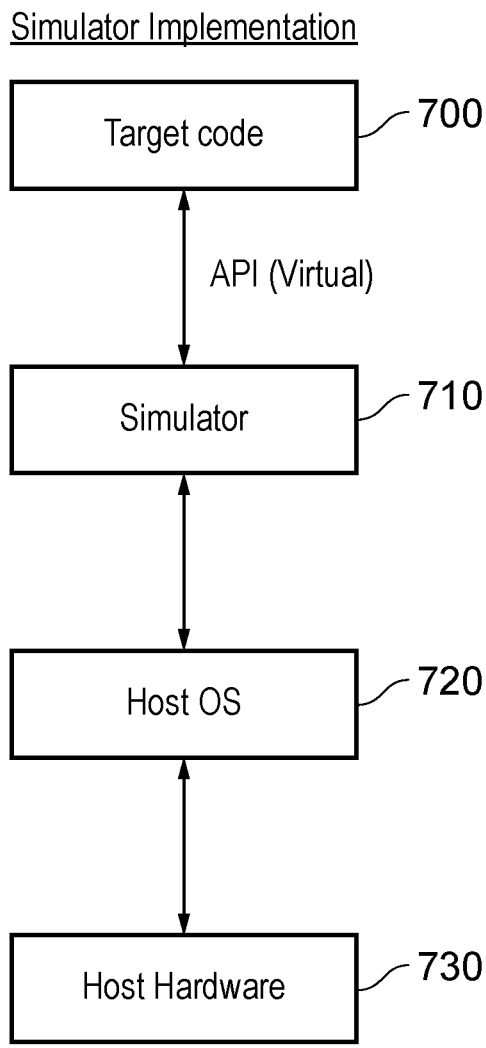

FIG. 10 schematically illustrates a data processing apparatus in accordance with embodiments of the present disclosure; and FIG. 11 schematically illustrates the components of a system which provides a simulator implementation in one embodiment.

At least some embodiments provide an apparatus comprising: ring buffer storage circuitry to store a ring buffer comprising multiple slots to hold a queued sequence of data items; data processing circuitry to execute a plurality of processes to add one or more data items to be processed to the queued sequence and to remove one or more data items for processing from the queued sequence, wherein each process is arranged to perform an acquire process to acquire at least one slot in the ring buffer and to subsequently perform a release process to release the at least one slot; and ring buffer metadata storage circuitry to store metadata for the ring buffer comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein the release process comprises an attempt to update the first reference indicator for the ring buffer comprising an atomic operation in which the expected slot value for the process is compared with the current slot indicator, and when the current slot indicator matches the expected slot value at least the current slot indicator is updated by modifying a value of the current slot indicator by a predetermined value, and when the current slot indicator does not match the expected slot value the pending slot indicator is updated by modifying a value of the pending slot indicator to indicate the presence and the location of one or more pending slots of the ring buffer without updating the current slot indicator.

The present techniques recognise that in a data processing system using a ring buffer as a queued sequence to which multiple independent actors (e.g. threads) add data items for processing to the queued sequence (i.e. are "producers") and remove data items for processing from the queued sequence (i.e. are "consumers"), that unless these actors only operate in a strictly in-order manner with respect to the order in which the sequence of data items must be processed (which would cause significant scalability problems if seeking to allow more and more actors to interact with the ring buffer) that in order to allow scalability the actors need to be able to release their updates out-of-order.

Generally there is a 3-step enqueuing operation for adding data items for processing to the tail end of the queued sequence and a 3-step dequeuing operation for removing data items from the head end of the queued sequence for further processing. The 3-step enqueuing operation is performed by firstly acquiring a slot (or multiple slots) in the ring buffer, secondly writing elements to the acquired slot(s), and thirdly releasing the acquired slot(s). Similarly, the 3-step dequeuing operation is performed by firstly acquiring a slot (or multiple slots) in the ring buffer, secondly reading elements from the acquired slot(s), and thirdly releasing the acquired slot(s). This is a relatively simple process in a system having a single producer and a single consumer, in that situation being naturally lock-free. However, in the case of a system comprising multiple producers and multiple consumers, the enqueuing operations and dequeuing operations require synchronisation between the independent actors that interact with the ring buffer. In particular, in the case where multiple producers (or consumers) each interact with the ring buffer to add (or remove) one or more data items at the tail end (or the head end) of the queued sequence, each producer (or consumer) attempts to acquire a given number of slots at the tail end (or the head end) of the queued sequence and subsequently releases the acquired slots. In this way, one producer (or consumer) can block other producers (or consumers) from completing due to the constraint that they must release their updates to the ring buffer in order of ring buffer acquisition (i.e. in the order of the queued sequence of data items).

The present techniques make use of ring buffer metadata to break the interdependency between the multiple independent actors to allow the multiple independent actors to execute in parallel and release their updates in an out-of-order manner with respect to the order of the queued sequence whilst preserving the order of the sequence of data items. To do this, the present techniques provide ring buffer metadata comprising a first reference indicator and a second reference indicator that can be accessed by atomic operations. The multiple independent actors can each update this ring buffer metadata in an out-of-order manner such that each actor can cause a change in the metadata to mark their updates for later release. The ring buffer metadata can therefore be updated by an actor that has completed an enqueue operation or a dequeue operation in order to provide an indication of which slots in the ring buffer are pending release so that the ring buffer metadata can subsequently be updated in a manner that releases the slots according to an order in which the slots were acquired. This ring buffer metadata can allow independent actors to release their updates in-order and out-of-order with respect to the order in which the sequence of data items must be processed thereby providing a non-blocking ring buffer release implementation. The respective actors can interact with the ring buffer concurrently to release their updates and the ordering of the sequence of data items can be preserved by atomically updating the first reference indicator, wherein an actor attempting to release an update (whether it is in-order or out-of-order) can update the first reference indicator to modify at least one value associated with the first reference indicator, such that each actor is able to modify the ring buffer metadata even if that actor is releasing in an out-or-order manner. Moreover, the present techniques provide ring buffer metadata storage for storing the metadata for the ring buffer in memory which can be accessed by respective independent actors executed by a processor core by performing metadata operations based on "far" atomics ("far" atomics in the sense that the atomic operations access data in the memory or a cache further out in the memory system from the core, rather than "near" atomics which atomically access data in a closely coupled cache). The implementation of such "far" atomic operations for performing atomic memory updates for ring buffer metadata means that respective actors can concurrently attempt to update the ring buffer metadata in a manner that reduces latency associated with snooping (i.e. snoop latency) because "near" accesses to metadata which give rise to increases in snoop latency can be avoided or restricted. This allows the independent actors to update the ring buffer metadata, so as to interact with the ring buffer to release updates, and latency arising from contention for the ring buffer metadata due to multiple actors attempting to access the metadata concurrently can be reduced. The implementation of such "far" atomic operations can reduce the latency associated with snooping, and thereby allows a reduction in the time required for each metadata operation to be performed so that metadata operations can be performed by the actors with greater frequency which improves scalability in that a greater number of cores can operate on the ring buffer concurrently.

The first reference indicator comprises a current slot indicator indicative of a location of a current slot of the multiple slots of the ring buffer and a pending slot indicator indicative of a presence and a location of one or more pending slots of the multiple slots of the ring buffer, the one or more pending slots having been acquired after the current slot with respect to the order of the queued sequence. The current slot indicator indicates a location in the ring buffer that signifies the current location of either the tail end or head end of the queued sequence of data items. For example, for a ring buffer comprising $2^N$ slots (i.e. ring buffer having $2^N$ elements where N is an integer), the current slot indicator can either be used to provide an indication of which slot in the ring buffer corresponds to an oldest data item (at the head end) or which slot in the ring buffer corresponds to a newest data item (at the tail end). In this way, the current slot indicator may be a scalar value capable of signifying a location of any given slot in the ring buffer at a given time depending on the location of the head end or tail end of the queued sequence in the ring buffer. It will be understood that the current slot indicator can indicate a location of a current slot in the ring buffer to signify a location of an end (head or tail) of the queued sequence of data items by indicating a location of an empty (unused) slot available for writing to or a location of a non-empty (used) slot not available for writing to but available for consumption (reading).

In addition, the first reference indicator comprises the pending slot indicator indicative of a location of one or more pending slots of the multiple slots of the ring buffer. The pending slot indicator can be updated by actors releasing their updates out-of-order such that the pending slot indicator indicates a presence of at least one pending slot (it is possible that there are no pending slots) in the ring buffer and also indicates a location of at least one pending slot in the ring buffer when a pending slot is indicated to be present. The pending slot indicator may for example be a scalar value that indicates a location in the ring buffer of a slot for which the enqueue operation (head end) or dequeue operation (tail end) has been completed by the actor and has been released by the actor out-of-order and is pending release by the ring buffer.

In this way, the first reference indicator provides: an indication of a location of a current slot of the ring buffer; an indication as to whether there are one or more updates that have been released out-of-order by an actor that interacts with the ring buffer; and an indication of a location of one or more pending slots in the ring buffer corresponding to the one or more updates released out-of-order by the actor that interacts with the ring buffer. Hence, the first reference indicator may for example be used as a head pointer or a tail pointer for a current slot of the queued sequence of data items whilst also indicating a presence and a location of one or more pending slots of the queued sequence at the head end or tail end, respectively. When an actor in the system wishes to release an update (to release acquired slot(s) after completing reading from or writing to the slot(s)), the metadata for the ring buffer can be atomically accessed by the actor and the first reference indicator can be updated to allow the actor to release the updates by updating either the current slot indicator or the pending slot indicator of the first reference indicator. In this way, the first reference indicator can be updated by actors that release their updates in-order with respect to the order of the queued sequence of data items and also by actors that release their updates out-of-order with respect to the order of the queued sequence of data items, and therefore the actors are not constrained to releasing their updates to the ring buffer in order of ring buffer acquisition and a non-blocking ring buffer release implementation can therefore be realised.

The second reference indicator comprises an expected slot indicator indicative of an expected location of the current slot of the ring buffer. A given actor that interacts with the ring buffer can attempt to update the second reference indicator in order to acquire one or more slots in the ring buffer for writing to (producer) or reading from (consumer). A producer or consumer may wish to acquire one or more slots of the ring buffer and will attempt to update the second reference indicator to acquire the one or more slots, the attempt comprising an atomic operation (atomic acquire operation) that accesses the ring buffer metadata. For example, a producer may wish to acquire one or more slots at the tail end of the queued sequence and will therefore attempt to access the ring buffer metadata and update the second reference indicator by modifying a value associated with the second reference indicator to point to another slot, such that other producers subsequently attempting to acquire one or more slots at the tail end of the queued sequence cannot acquire the slots already acquired by the first producer. When a producer or consumer performs the acquire process and successfully acquires one or more slots in the ring buffer, an expected slot value is returned for the producer or consumer. The expected slot value is the value of the expected slot indicator when the producer or consumer acquired the one or more slots in the ruing buffer. In this way, an expected slot value indicative of the value of the expected slot indicator at the time when a process acquired the one or more slots in the ring buffer can be held for the process, and the expected slot value can subsequently be compared with the first reference indicator when the process subsequently attempts to release the one or more slots. In this way, the comparison of the expected slot value for a process with the first reference indicator can provide an indication of whether the process is attempting to release the acquired slots in an out-of-order manner or an in-order manner with respect to the order of the queued sequence of data items. In some examples, a process may successfully acquire X slots (X>1) in the ring buffer and the expected slot value may provide an indication of the value of the expected slot indicator when the process acquired the X slots. As such, the comparison of the expected slot value with the current slot indicator may be a range comparison where the current slot indicator is compared with a range given by a combination of the expected slot value and the number of acquired slots. For example, if the process acquired two slots, and the value of the expected slot indicator at the time when the process acquired the two slots was N, then a range defined by N and the slot adjacent to the slot indicated by N can be used for comparison with the current slot indicator.

The present techniques realise that ring buffer metadata can be stored in memory and accessed by actors executing atomic operations to acquire and release slots and the ring buffer metadata can preserve the ordering of the queued sequence. Whilst slots can be acquired by accessing and updating the second reference indicator, the order in which the actors complete and thus attempt to release their slots can differ from the order in which the slots were acquired and actors may thus attempt to access and update the first reference indicator in a different order to which the second reference indicator is accessed and updated. When an actor successfully updates the second reference indicator a value of the expected slot indicator is modified to indicate that the actor has acquired one or more slots in the ring buffer. An expected slot value corresponding to the value of the expected slot indicator at the time when the actor acquired the one or more slots is returned to the actor and used by the actor when attempting to release the acquired slots to establish whether the actor is releasing in-order or out-of-order (i.e. the slot location expected by the actor is based on the value of the second reference indicator at the time when the actor acquired the one or more slots). When the actor completes writing to or reading from the one or more acquired slots and seeks to release the one or more acquired slots, using the expected slot value returned for the actor when acquiring the slots, the actor can attempt to update the first reference indicator for the ring buffer by atomically accessing the ring buffer metadata and comparing the expected slot value with the current slot indicator of the first reference indicator. It will therefore be understood that the atomic release operation comprises an attempt by the actor to update the first reference indicator, in which the actor compares the expected slot value with the first reference indicator. Specifically, the actor attempts to atomically update the first reference indicator based on a comparison of the expected slot value with the value of the current slot indicator and the manner in which the first reference indicator is updated by the actor is dependent upon whether or not the expected location of the current slot indicated by the expected slot value matches the location of the current slot indicated by the current slot indicator of the first reference indicator.

In some embodiments, when the current slot indicator does not match the expected slot value and the expected slot indicator indicates an expected location of the current slot that is not after the current slot indicated by the current slot indicator, with respect to an order of the queued sequence, the first reference indicator is not updated.

The present techniques recognise that whilst a process is attempting to atomically access and update the first reference indicator, other processes can concurrently attempt to atomically access and update the first reference indicator to release a slot. When the expected slot value for the process does not match the value of the current slot indicator of the first reference indicator, this indicates that the process is attempting to release the slot out-of-order with respect to the order of the queued sequence of data items. When the expected slot value for the process does not match the value of the current slot indicator and the expected slot value also indicates a location of a slot that is not located after the location of the current slot with respect to the ordering of the queued sequence of data items, this indicates that the process is not attempting to release a slot that is ahead with respect to the ordering of the sequence (the process is not attempting to release the slot early with respect to the ordering of the sequence). In this case, the process completes the release process without updating the first reference indicator, because the process is attempting to release a slot that is 'behind' with respect to the ordering of the queued sequence and the release of the slot is already reflected in the first reference indicator.

In some embodiments, when the current slot indicator does not match the expected slot value, the pending slot indicator is updated by modifying the value of the pending slot indicator to indicate the presence and the location of one or more pending slots in the ring buffer with respect to the current slot indicated by the current slot indicator.

The present techniques recognise that when the expected slot value for the process does not match the value of the current slot indicator of the first reference indicator and the expected slot value also indicates a location of a slot that is located after the location of the current slot with respect to the ordering of the queued sequence of data items, this indicates that the process is attempting to release a slot that is out-of-order and 'ahead' with respect to the order of the sequence. In other words, this indicates that the process is attempting to release the slot before another process has released another slot that is earlier in the sequence than the slot that the process is attempting to release. In this case, when performing the release process, the process atomically accesses the first reference indicator and updates the pending slot indicator to indicate that there are one or more pending slots.

In some embodiments, the pending slot indicator comprises a limit indicator, the limit indicator indicating a location of a furthest pending slot that is located furthest from the current slot in the ring buffer with respect to an order of the queued sequence.

In some embodiments, the pending slot indicator comprises a change indicator, a change in the change indicator indicating a change in a number of pending slots between the current slot and the furthest pending slot.

The present techniques provide a pending slot indicator which comprises a limit indicator to indicate a location of a furthest pending slot in the ring buffer. In addition, the pending slot indicator may comprise a change indicator, where a change in the change indicator is indicative of a change in the number of pending slots present between the current slot indicated by the current slot indicator and the furthest pending slot indicated by the limit indicator. A process may release a slot that is located between the current slot and the furthest pending slot by changing the change indicator such that the presence of an additional pending slot is indicated.

Depending on the configuration of the pending slot indicator (e.g. whether there are one or more pending slots or whether there are no pending slots) at the time when a process updates the pending slot indicator, either the limit indicator or the change indicator or both the limit indicator and the change indicator can be updated. For example, the order of the queued sequence may be such that a slot A is followed next by a slot B which is followed next by a slot C and so on. In this case, if the current slot indicated by the current slot indicator is the slot A and a process wishes to release the slot D before the slot B or slot C has been released, then the process will update the limit indicator to indicate the presence and the location of the slot D as a pending slot. In this way, the location of slot D can be indicated as the furthest pending slot. If another process subsequently wishes to release a slot E, then the limit indicator can be updated to indicate the presence and the location of the slot E as the furthest pending slot from the current slot (slot A). In this way, the limit indicator can be updated by processes releasing updates out-of-order to indicate a location of a furthest pending slot.

Continuing with the above example, if the limit indicator indicates the presence and the location of the slot E as the furthest pending slot from the current slot (slot A), and another process subsequently wishes to release the slot C, then the change indicator can be updated to indicate a change in the number of pending slots between the current slot (slot A) and the furthest pending slot (slot E). In this way, the change indicator can be updated to allow a process to release a slot that is located between the current slot and the furthest pending slot. The change in the change indicator thus indicates that an update has been released for which the limit indicator could not be updated. As such, the change in the change indicator indicates that there is a change in the number of pending slots between the current slot and the furthest pending slot. This allows processes to release updates by updating either the limit indicator or the change indicator, or both, and the processes can thus be freed rather than having to wait for earlier processes to release their updates. In some examples, either the limit indicator or the change indicator is updated depending on whether a process is attempting to release a slot that is further from the current slot and the furthest pending slot indicated by the limit indicator, as discussed above. Alternatively, in some examples, the change indicator may be updated for each update that is released, so that a change in the change indicator may serve to indicate that an update has been released by a process and the limit indicator indicates the location of the furthest pending slot.

The limit indicator may be updated to indicate the presence and the location of the slot E as the furthest pending slot from the current slot (slot A), as described above. When an in-order process attempts to release the slot B, such that the process is attempting to release in-order with respect to the order of the queued sequence of data items, the in-order process can perform a scan of the ring buffer from the current slot indicated by the current slot indicator up to the furthest pending slot indicated by the limit indicator so that the in-order process can release other pending slots between the current slot and the furthest pending slot. In this way, the in-order process can release the slot B in-order with respect to the order of the queued sequence and the in-order process can scan the ring buffer between the current slot and the furthest pending slot to identify and release other slots between the current slot and the furthest pending slot in-order with respect to the order of the queued sequence of data items. A value of the change indicator before the process performs scanning of the ring buffer for pending updates can be used by the process for comparison with a value of the change indicator after scanning of the ring buffer to identify whether one or more updates have been released out-of-order for which the limit indicator could not be updated. When the comparison of the old value (after scanning) for the change indicator with the new value (before scanning) of the indicator indicates that an update has been released out-of-order for which the limit indicator could not be updated, the in-order process can scan the ring buffer again to identify further slots that may be released in-order.

In some examples, the pending slot indicator may use just the change indicator without using the limit indicator. In this case, the change indicator may be updated for each slot that is released so that the change indicator is updated to indicate a change in the number of pending slots. An in-order process can perform a scan beginning at the current slot indicated by the current slot indicator, and the scan will end when the in-order process identifies a slot that is not pending release. In this way, the in-order process can release the slot B in-order, scan the ring buffer for pending slots in order to release the slot C that is pending release, and the process will stop the scan when a non-pending slot is identified (for example, a non-pending slot may be indicated by a null pointer).

In some embodiments, the pending slot indicator is updated by modifying at least one of the limit indicator and the change indicator when the current slot indicator does not match the expected slot value.

In some embodiments, when the expected slot value indicates a slot that is located further from the current slot in the ring buffer than the furthest pending slot indicated by the limit indicator, with respect to an order of the queued sequence, the limit indicator is updated. In some embodiments, the limit indicator is updated based on the value of the expected slot value to indicate a different location for the furthest pending slot.

When the pending slot indicator indicates the presence of a pending slot and the expected slot value for the process indicates a location of a slot that is further from the current slot than the furthest pending slot currently indicated by the limit indicator, the process will update the pending slot indicator by updating the limit indicator to indicate a new furthest pending slot corresponding to the slot that the process is attempting to release. A process that attempts to release a slot in an out-of-order manner can update the limit indicator so that the limit indicator indicates another slot as being the furthest pending slot. Therefore, when a process attempts to release a slot in-order with respect to the order of the queued sequence of data items, the in-order process can perform a scan using the limit indicator to define a furthest pending slot so that the scan for pending slots in the ring buffer is performed between the current slot and the furthest pending slot.

In some embodiments, when the expected slot value indicates a slot that is located between the current slot and the furthest pending slot the change indicator is updated without updating the limit indicator. Since the slot is located closer to the current slot than the furthest pending slot, the limit indicator will not be updated and instead the out-of-order process will release its update by updating the change indicator to indicate a change in the number of pending slots between the current slot and the furthest pending slot.

When the pending slot indicator indicates the presence of a pending slot and the expected slot value for the process indicates a location of a slot that is not further from the current slot than the furthest pending slot currently indicated by the limit indicator, the process will update the pending slot indicator by updating the change indicator to indicate the presence of an additional pending slot between the current slot and the furthest pending slot without updating the limit indicator because the location of the furthest pending slot is unchanged. This allows an out-of-order process to release its update when the slot to be released by the process is not further from the current slot than the furthest pending slot by updating the change indicator. Therefore, when another process attempts to release a slot in-order with respect to the order of the queued sequence of data items, the in-order process can perform a scan in accordance with the limit indicator and the change indicator to allow other pending slots to be released in-order with respect to the order of the queued sequence of data items. By comparing the change indicator before releasing the in-order slot with the change indicator after releasing the in-order slot, a change in the change indicator can be identified so that the process can identify whether to perform another scan of the ring buffer for one or more pending slots that have been released between starting and ending the scan.

When there are no pending slots present in the ring buffer, the limit indicator will indicate an absence of any pending slots in the ring buffer. As such, when a process attempts to release a single pending slot and the limit indicator has such a configuration, the process may only update the limit indicator to indicate the presence and the location of the single slot released by the process. Additionally, the process may also update the change indicator to indicate that there has been a change. In the case where a process attempts to release a plurality of pending slots and the limit indicator indicates that no pending slots are present, the process will update both the limit indicator and the change indicator to indicate the presence and the location of the furthest pending slot and to indicate the presence of the other pending slots between the current slot and the furthest pending slot.

In some embodiments, when the current slot indicator matches the expected slot value and the pending slot indicator indicates the presence of one or more pending slots of the ring buffer, the current slot indicator is updated by modifying the value of the current slot indicator according to a number of consecutive pending slots contiguous with the current slot. When the expected slot value matches the value of the current slot indicator this provides an indication that the process is attempting to release in-order with respect to the order of the queued sequence of data items. In this case, the process can perform a scan of the ring buffer from the slot indicated by the current slot indicator up to the furthest pending slot indicated by the limit indicator, and pending slots that are contiguous with the current slot can be released by the process. In this way, the process can release the one or more slots acquired by the process and also release one or more consecutive pending slot that are contiguous with the current slot.

In some embodiments, the value of the current slot indicator is modified to indicate a furthest pending slot of the one or more consecutive pending slots, and wherein the furthest pending slot is the pending slot of the one or more consecutive pending slots that is located furthest from the current slot in the ring buffer.

The present techniques allow a process to compare the expected slot value with the value of the current slot indicator of the ring buffer metadata, and when the current slot indicator matches the expected slot value this indicates that the process is attempting to release the slot in-order with respect to the order of the queued sequence of data items. When attempting to release a slot in-order with respect to the order of the queued sequence, the pending slot indicator can be read to provide an indication as to the presence and, if present, the furthest location of any pending slots. When the pending slot indicator indicates that there are no pending slots (indicates an absence of a pending slot in the ring buffer) the current slot indicator can be updated to modify the value of the current slot indicator to indicate a location of a next slot in the queued sequence. When the pending slot indicator indicates a presence of one or more pending slots in the ring buffer, a scan of the slots in the ring buffer located between the current slot and the furthest pending slot indicated by the limit indicator can be performed to identify whether there are one or more pending slots that are contiguous with the current slot. In the case where there are one or more pending slots contiguous with the current slot, the current slot indicator can be updated to indicate a location of a furthest pending slot that is furthest from the current slot where all the slots between the current slot and the furthest pending slot are slots that are pending. In this way, the pending slot indicator can be read and a scan over a given number of slots in the ring buffer can be performed to identify a location of each pending slot between the current slot and the slot indicated by the limit indicator, and when the system is in-order the first reference indicator can be updated based on the number of consecutive pending slots that are contiguous with the current slot. In the case where there are one or more pending slots but none of the pending slots are contiguous with the current slot, the current slot indicator can be updated to modify the value of the current slot indicator to indicate a location of a next slot in the queued sequence so as to release the slot in-order with respect to the order of the queued sequence of data items.

In some embodiments, the current slot indicator is indicative of the location of the current slot at either a head end or a tail end of the queued sequence of data items and the expected slot indicator is indicative of the expected location of the current slot at the same end of the queued sequence of data items.

In some embodiments, the first reference indicator is a tail indicator for the tail end of the queued sequence of data items for the processes that remove data items from the queued sequence and the second reference indicator is a tail indicator for the tail end of the queued sequence of data items for the processes that add data items to the queued sequence.

In some embodiments, the processes that add data items to the queued sequence are arranged to perform the acquire process to acquire at least a next empty slot in the ring buffer, the acquire process comprising an attempt to update the second reference indicator according to an atomic operation.

In some embodiments, the first reference indicator is a head indicator for the head end of the queued sequence of data items for the processes that add data items to the queued sequence and the second reference indicator is a head indicator for the head end of the queued sequence of data items for the processes that remove data items from the queued sequence.

In some embodiments, the processes that remove data items from the queued sequence are arranged to perform the acquire process to acquire at least a next non-empty slot in the ring buffer, the acquire process comprising an attempt to update the second reference indicator according to an atomic operation.

In some embodiments, when the process performs the acquire process to acquire the at least one slot in the ring buffer the second reference indicator is updated by modifying the value of the expected slot indicator according to a number of slots acquired by one of the processes.

In some embodiments, the data processing circuitry is arranged to execute the processes that add data items to the queued sequence in parallel, and each process concurrently attempts to update the first reference indicator according to the atomic operation.

In some embodiments, the data processing circuitry is arranged to execute the processes that remove data items from the queued sequence in parallel, and each process concurrently attempts to update the first reference indicator according to the atomic operation.

At least some embodiments provide an apparatus comprising: ring buffer storage circuitry to store a ring buffer comprising multiple slots to hold a queued sequence of data items; data processing circuitry to execute a plurality of processes to add one or more data items to be processed to the queued sequence and to remove one or more data items for processing from the queued sequence, wherein each process is arranged to perform an acquire process to acquire at least one slot in the ring buffer; and ring buffer metadata storage circuitry to store metadata for the ring buffer comprising a first reference indicator and a second reference indicator, the first reference indicator comprising a current slot indicator indicative of a location of a current slot at one end of the queued sequence of data items and the second reference indicator comprising an expected slot indicator indicative of an expected location of a current slot at the other end of the queued sequence of data items, wherein the one end of the queued sequence of data items is either a head end or a tail end of the queued sequence of data items, wherein the acquire process comprises an attempt to update the second reference indicator for the ring buffer comprising an atomic operation in which a number of slots requested for acquisition by a process is compared with the current slot indicator and the expected slot indicator, and when the current slot indicator and the expected slot indicator indicate that one or more slots in the ring buffer are eligible for acquisition the expected slot indicator is updated by modifying a value of the expected slot indicator. This provides an atomic acquire operation that allows processes to atomically access and update the ring buffer metadata to acquire one or more slot in the ring buffer.

In some embodiments, the first reference indicator is a tail indicator for the tail end of the queued sequence of data items for the processes that remove data items from the queued sequence and the second reference indicator is a head indicator for the head end of the queued sequence of data items for the processes that remove data items from the queued sequence. In some embodiments, for the processes that remove data items from the queued sequence the number of slots eligible for acquisition corresponds to a number of occupied slots in the ring buffer, and wherein the number of occupied slots in the ring buffer is determined based on the location of the current slot at the head end and the location of the current slot at the tail end. In this way, for consumers that remove data items from the queued sequence, an index corresponding to the location of the head end can be subtracted from an index corresponding to the location of the tail end (tail-head) in order calculate the number of occupied slots in the ring buffer.

In some embodiments, the first reference indicator is a head indicator for the head end of the queued sequence of data items for the processes that add data items to the queued sequence and the second reference indicator is a tail indicator for the tail end of the queued sequence of data items for the processes that add data items to the queued sequence. In some embodiments, for the processes that add data items to the queued sequence the number of slots eligible for acquisition corresponds to a number of unoccupied slots in the ring buffer, and wherein the number of unoccupied slots in the ring buffer is determined based on a total number of slots in the ring buffer, the location of the current slot at the head end and the location of the current slot at the tail end.

In this way, for producers that add data items to the queued sequence, an index corresponding to the location of the head end can be subtracted from an index corresponding to the location of the tail end (tail-head) in order calculate the number of occupied slots in the ring buffer, and the number of occupied slots can be subtracted from the total number of slots in the ring buffer in order to calculate the number of unoccupied slots in the ring buffer (i.e. ring buffer size−(tail-head)=ring buffer size+head−tail=number of unoccupied slots), wherein the unoccupied slots are eligible for acquisition by a producer.

Some particular embodiments are now described with reference to the figures.

Figure 1:
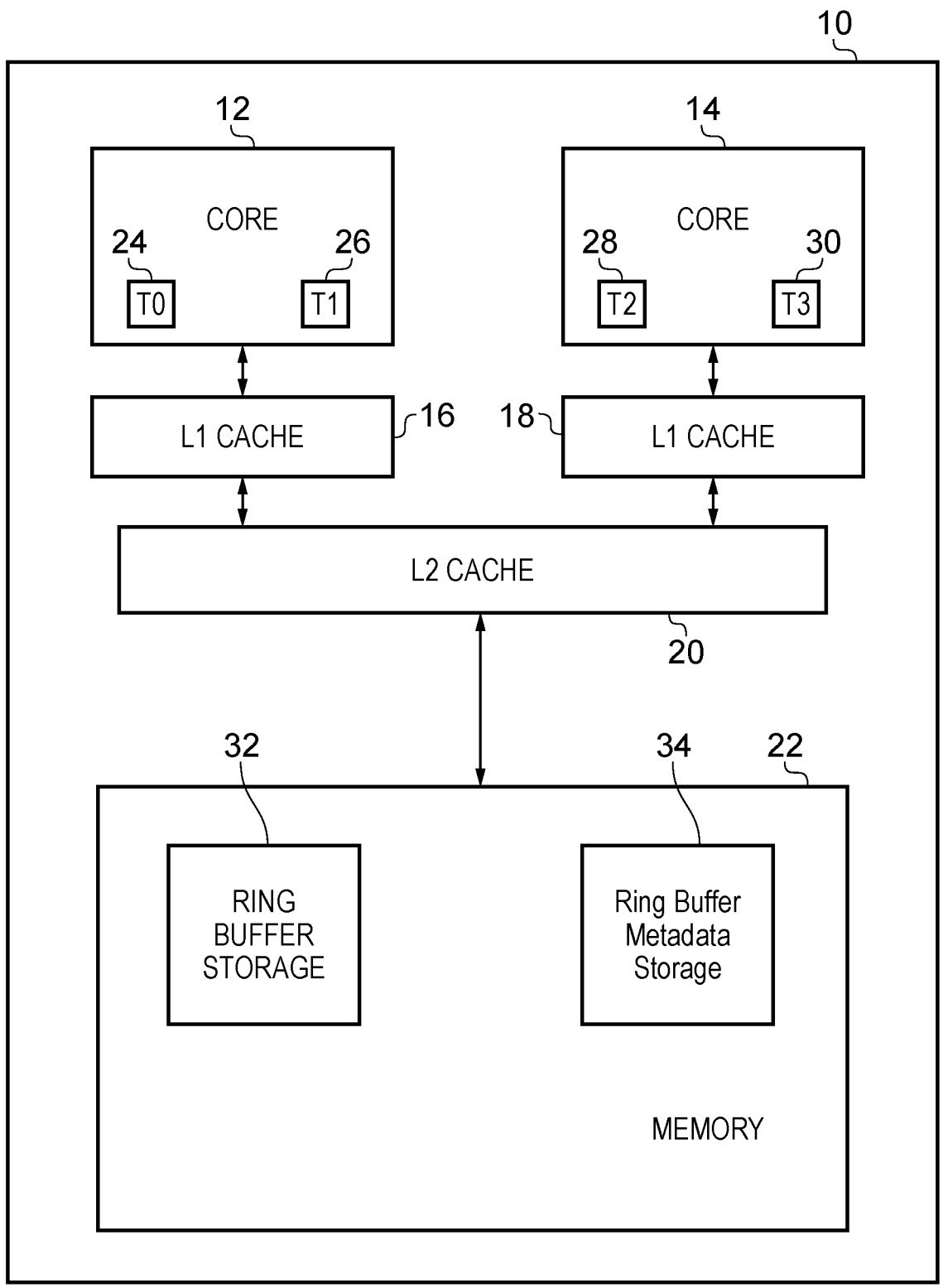

FIG. 1 schematically illustrates a data processing apparatus 10 in one embodiment. The data processing apparatus 10 comprises a first core 12 and a second core 14. Each of these cores are provided with their own private L1 cache namely caches 16 and 18 respectively. A level 2 cache 20 is shared and leads to the memory 22. Not only is the data processing apparatus 10 a multi-core system, it is also a multi-threaded system, this being illustrated in FIG. 1 by the representations of threads T0 24 and T1 26 executing on core 12, and threads T2 28 and T3 30 on core 14. In a manner with which one of ordinary skill in the art will be familiar, a given thread executing in a given processor core performs data processing operations on data retrieved from the memory 22, temporary copies of data items retrieved from the memory 22 being cached in the cache hierarchy formed by the relevant intervening cache levels. Some data structures of particular relevance to some embodiments of the present techniques are schematically illustrated in memory 22 of FIG. 1, namely the ring buffer storage 32 and the ring buffer metadata storage 34. The ring buffer metadata storage 34 corresponds to a number of storage locations in the memory 22 such that the ring buffer metadata can be stored at the storage locations and accessed by the threads executing on the cores. The data structures of the ring buffer metadata stored at the storage locations in the memory 22 can therefore be atomically accessed by the threads T0, T1, T2 and T3 executing on the cores 13 and 14. The present techniques will be explained further with reference to these data structures in the figures which follow.

Figure 2:
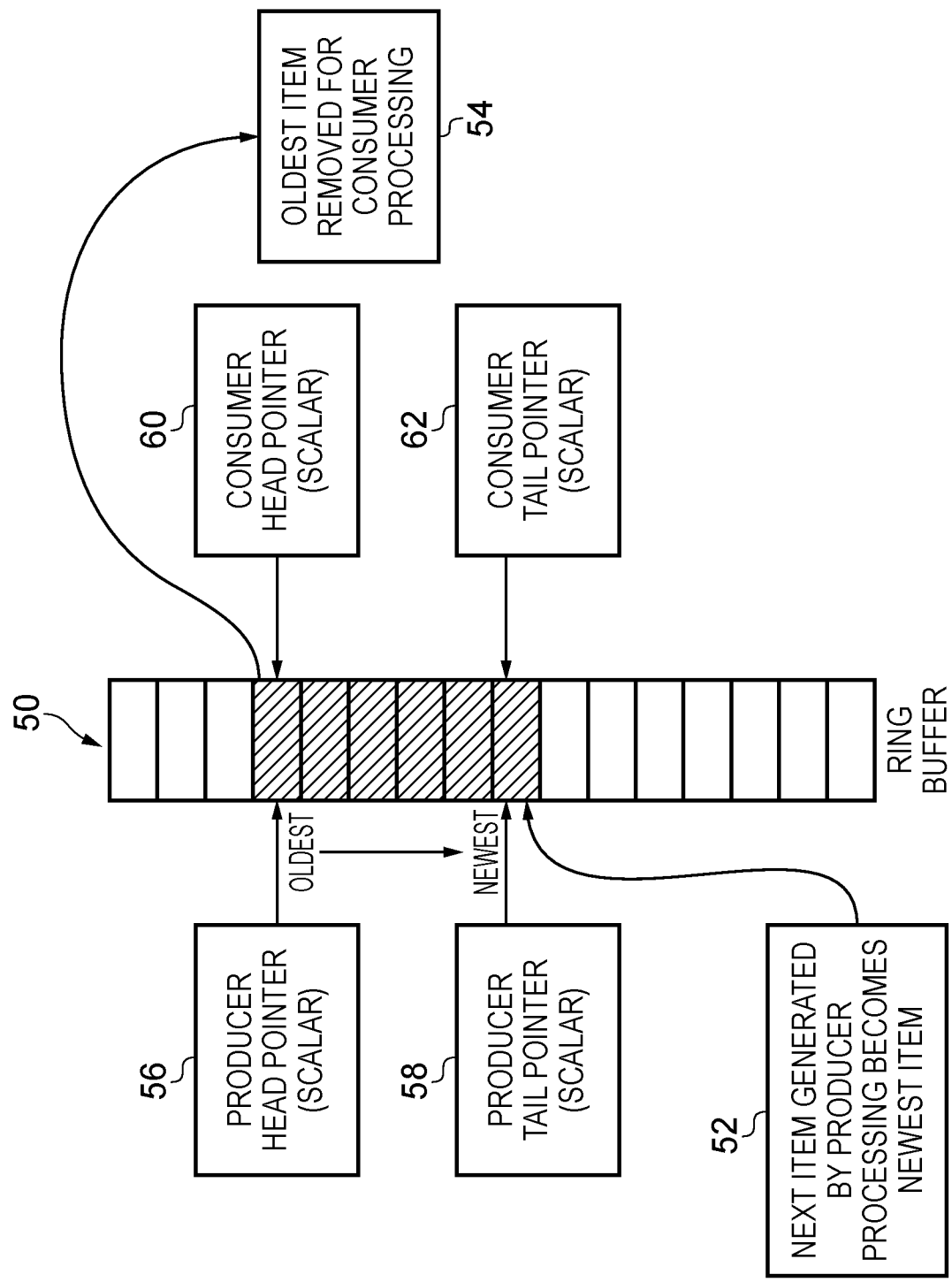

FIG. 2 schematically represents a ring buffer 50 which wraps around in a manner with which one of ordinary skill is familiar. This ring buffer 50 stored in the ring buffer storage 32 and thus, logically, in the memory 22 shown in FIG. 1 is used by the processes executing on the cores 12 and 14 to coordinate the processing of particular data items. Generally the use of the ring buffer can be viewed from two aspects, firstly those of one or more "producers" in the system which generate data items that are stored in the ring buffer 50, and secondly those of the "consumers" which remove data items from the ring buffer 50 for further data processing. A key feature of the ring buffer is that it is arranged to be used such that data items held in the ring buffer are in a queued (ordered) sequence, such that the order in which data items are generated by producers is also the order in which they are consumed by consumers. The general principle according to which this is effected is that a next data item (represented by the shaded slot in FIG. 2) generated by a producer (see item 52 in FIG. 2) is enqueued at a "tail" of the stored sequence, whilst the oldest data item still in the sequence is dequeued from its head end for consumer processing (see item 54 in FIG. 2). In other words, the data item at the head of the queued sequence is the oldest data item and the data item at the tail of the queued sequence is the newest data item. For the purpose of keeping track of the current status of valid data items in the ring buffer the system stores four pointers, two for the producers and two for the consumers. In the present techniques, ring buffer metadata is provided for these four pointers which can be atomically accessed and updated by independent actors. A producer head pointer 56 indicates the head of the queued sequence for producers in the system, whilst a producer tail pointer 58 indicates the tail of the queued sequence for the producers in the system. Similarly, a consumer head pointer 60 indicates the head of the queued sequence for consumers in the system and a consumer tail pointer 62 indicates the tail of the queued sequence for the consumers in the system. A significant point to note in the present context is that as shown in FIG. 2 the producer head pointer 56, producer tail pointer 58, consumer head pointer 60 and the consumer tail pointer 62, each represented by a scalar value in this example, are provided by metadata stored in the ring buffer metadata storage circuitry 34 in the memory 22 (as illustrated in FIG. 1), and the metadata for the ring buffer is accessed by an actor (e.g. thread T0 24, T1 26, T2 28 or T3 30) according to an atomic operation.

Figure 3:
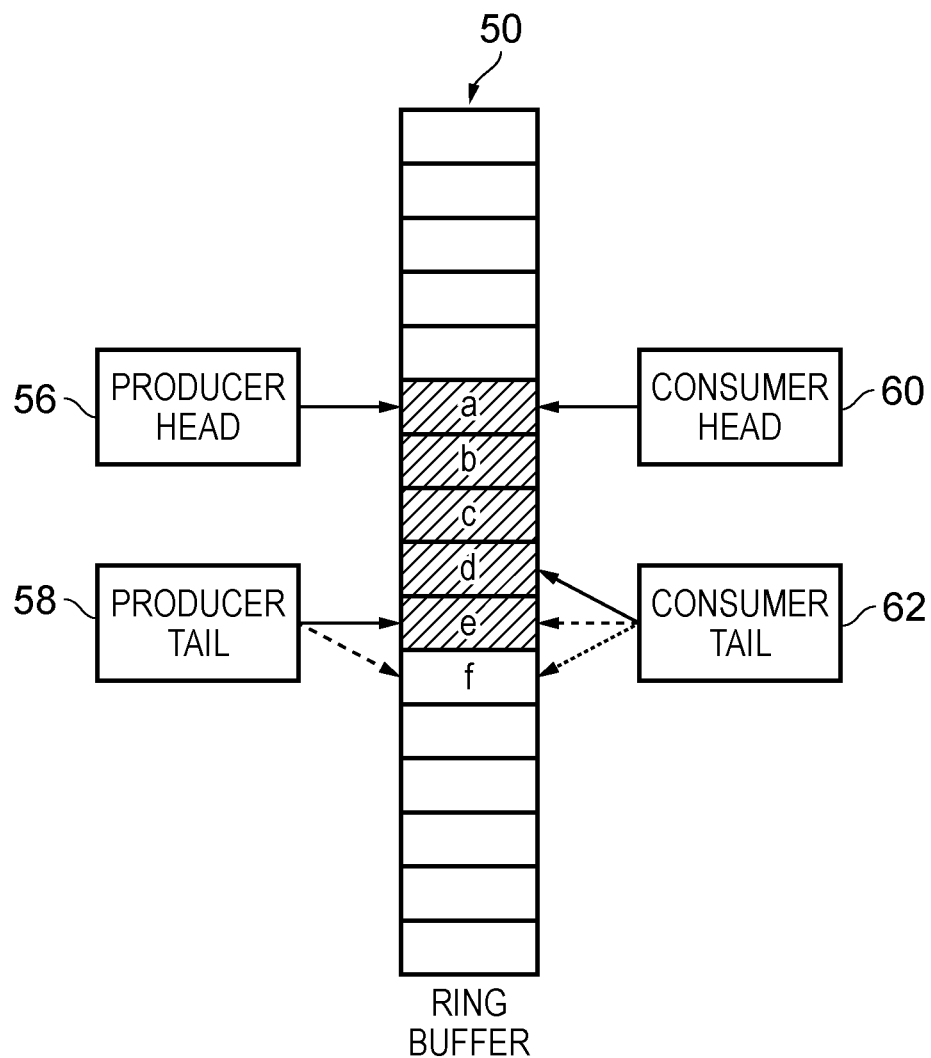

Referring now to FIG. 3, some of the above mentioned difficulties that may arise with respect to the coordinated use of a ring buffer in a data processing system where multiple processes make use of the ring buffer, and in particular where multiple producers and consumers are involved, are now discussed. As previously mentioned, generally there is a 3-step enqueuing and dequeuing operation which makes use of the ring buffer, and in a system comprising multiple producers and multiple consumers the enqueuing and dequeuing requires synchronisation between the producers and consumers. In particular, updates must be released in their order of acquisition (noting that the term "update" covers the release of both reads and writes). It is important that read updates are released in order so that content does not get overwritten before it has been read. Therefore a producer or consumer could have to wait for an earlier producer or consumer to finish doing this.

FIG. 3 schematically illustrates one scenario in which this interdependency can manifest itself. In the system making use of the ring buffer shown in FIG. 3, there are four pointers defined, namely a producer head pointer 56, a consumer head pointer 60, a producer tail pointer 58, and a consumer tail pointer 62. Where newly generated data items are added at the tail end of the queued sequence, when a producer wishes to enqueue a new data item making use of the ring buffer it writes to the producer tail pointer 58 and the consumer tail pointer 62. Conversely, when a consumer wishes to dequeue an item it must update the consumer head pointer 60 and the producer head pointer 56. Accordingly, in the illustrated situation where slots a, b, c, d, and e are currently in the active queue and the producer wishes to acquire slot f, this acquisition is possible by the producer updating the producer tail pointer 58 (updating of the producer tail pointer 58 by the producer to acquire slot f is represented by the dashed arrow pointing from producer tail 58 to slot f), but when the producer seeks to update the consumer tail pointer 62 to indicate data item f this cannot yet happen on the consumer side, i.e. specifically with respect to the consumer tail pointer 62, which currently still points to data item d, which is represented by the solid arrow pointing from consumer tail pointer 62 to slot d. Whilst the current producer has already updated the producer tail pointer 58 to f as part of the acquisition step of the enqueuing operation, the current producer is blocked from updating the consumer tail pointer 62 because updates must be released in their order of acquisition (i.e. the consumer tail pointer 62 must first be updated to point to slot e, which is represented by the dashed line, and then updated to point to slot f which is represented by the dotted line to release updates in order of their acquisition) and therefore the current producer has to wait for consumer tail pointer 62 to have the old value of the producer tail pointer 58, i.e. f.

Figure 4A:
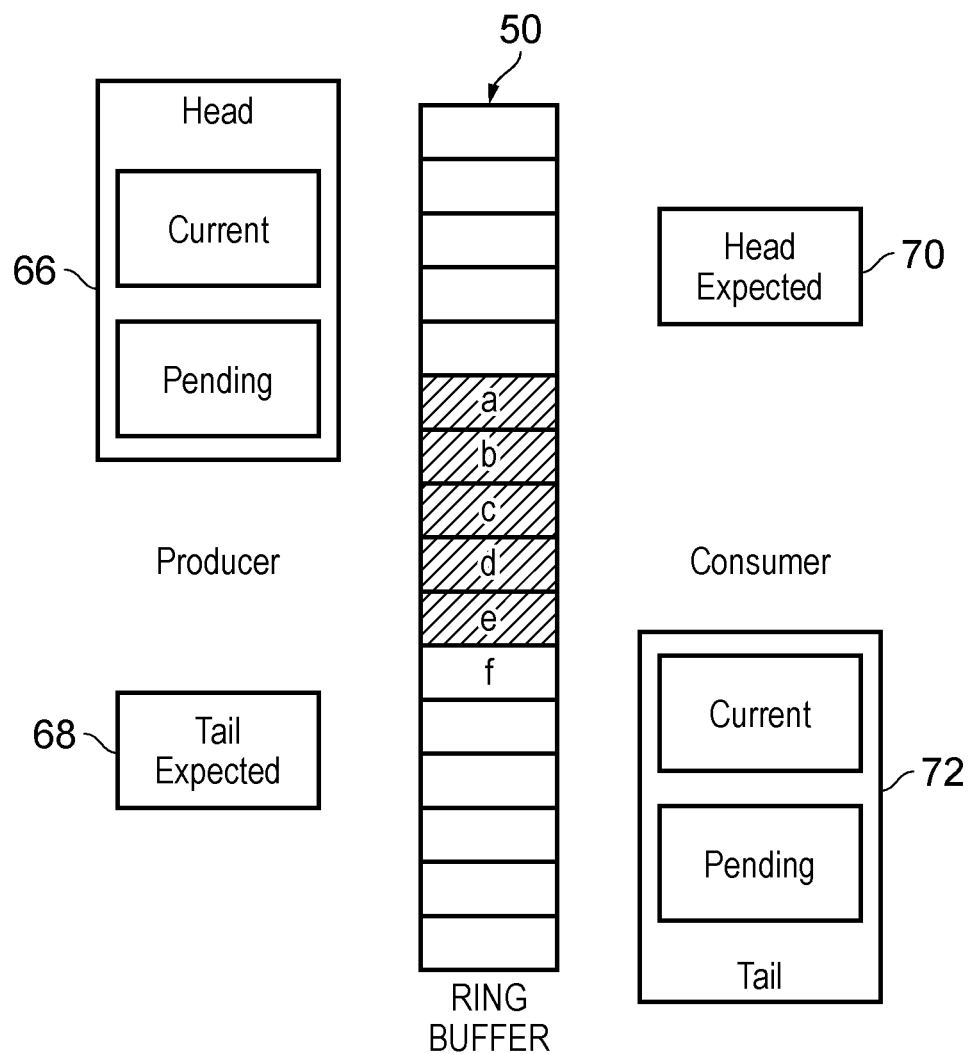
FIG. 4a illustrates ring buffer metadata comprising first reference indicators and second reference indicators in accordance with embodiments of the present disclosure.

The present techniques address this issue by an approach using the ring buffer metadata comprising the first reference indicator and the second reference indicator stored in the ring buffer metadata storage 34, which allows the producers and consumers to release updates in-order and out-of-order. FIG. 4a schematically illustrates an implementation of this approach using the ring buffer metadata whereby the above-described waiting for an earlier producer or consumer to complete a release does not happen. In the system making use of the ring buffer 50 shown in FIG. 4a, a first reference indicator 66 and a second reference indicator 70 are provided for the head end of the queued sequence, and a first reference indicator 72 and a second reference indicator 68 are provided for the tail end of the queued sequence (note that the first reference indicator 66 provided for the head end of the queued sequence is substantially the same as the first reference indicator 72 provided for the tail end of the queued sequence with the exception that the first reference indicator 66 is updated by the consumers and the first reference indicator 72 is updated by the producers). The present techniques will be described with reference to a head indicator that is an example of the first reference indicator which is provided for the head end of the queued sequence of data items, and a tail indicator that is also an example of the first reference indicator which is provided for the tail end of the queued sequence of data items. Specifically, the present techniques provide a head indicator that is a first reference indicator 66 for the producers at the head end of the queued sequence and a tail indicator that is a first reference indicator 72 for the consumers at the tail end of the queued sequence. Each producer can read the head indicator that is the first reference indicator 66 for the producers to identify a slot location corresponding to the head of the queued sequence, and each producer can update the second reference indicator 68 to acquire slots in the ring buffer and update the first reference indicator 72 to release slots. Similarly, each consumer can read the tail indicator that is the first reference indicator 72 for the consumers to identify a slot location corresponding to the tail of the queued sequence, and each consumer can update the second reference indicator 70 to acquire slots in the ring buffer and update the first reference indicator 66 to release slots. In this way, the head indicator provided for the head end of the queued sequence provides: an indication of a location of a current slot at the head end of the queued sequence in the ring buffer; an indication as to whether there are one or more updates that have been released out-of-order by a consumer that interacts with the ring buffer at the head end; and an indication of the furthest location of one or more pending slots in the ring buffer corresponding to the one or more updates released out-of-order by the consumer that interacts with the ring buffer at the head end. Similarly, the tail indicator provided for the tail end of the queued sequence provides: an indication of a location of a current slot at the tail end of the queued sequence in the ring buffer; an indication as to whether there are one or more updates that have been released out-of-order by a producer that interacts with the ring buffer at the tail end; and an indication of the furthest location of one or more pending slots in the ring buffer corresponding to the one or more updates released out-of-order by the producer that interacts with the ring buffer at the tail end. For the purpose of keeping track of the current status of valid data items at the head end of the queued sequence in the ring buffer, a head indicator (first reference indicator) 66 comprising a current slot indicator and a pending slot indicator is provided for the producer head and a second reference indicator 70 comprising an expected slot indicator is provided for the consumer head, and the dequeuing operations for removing data items from the head end of the queued sequence for further processing are performed based on an atomic operations that access the head indicator 66 and the second reference indicator 70. Similarly, for the purpose of keeping track of the current status of valid data items at the tail end of the queued sequence in the ring buffer the system, a tail indicator (first reference indicator) 72 comprising a current slot indicator and a pending slot indicator is provided for the consumer tail and a second reference indicator 68 comprising an expected slot indicator is provided for the producer tail, and the enqueuing operations for adding data items to the tail end of the queued sequence are performed based an atomic operations that access the tail indicator 72 and the second reference indicator 68.

Figure 4B:
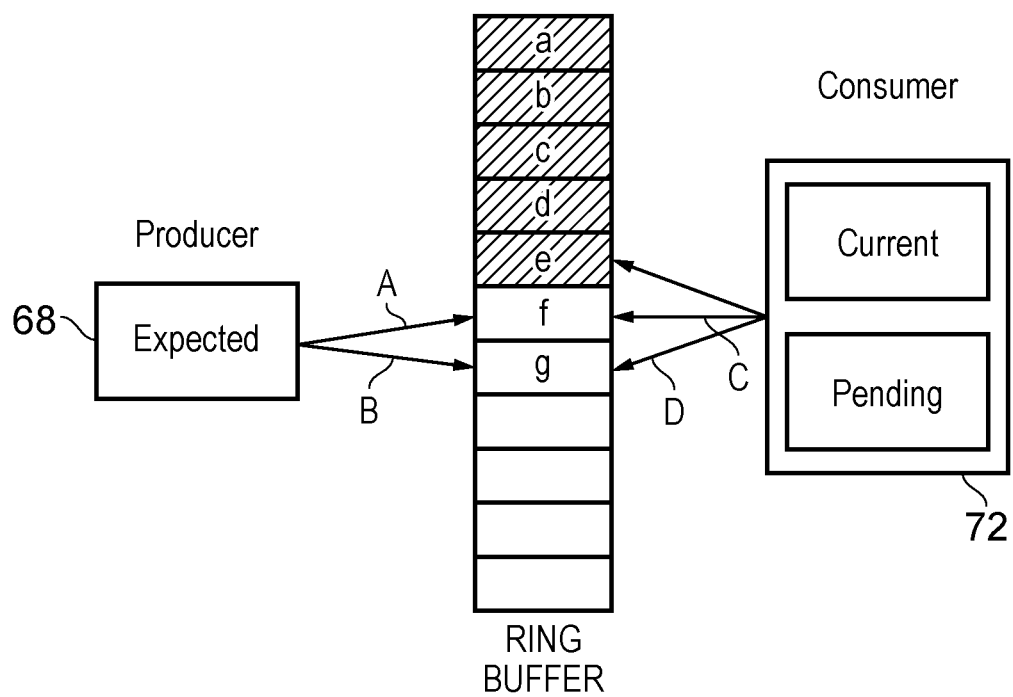
FIG. 4b illustrates ring buffer metadata for keeping track of a tail end of a queued sequence of data items in accordance with embodiments of the present disclosure.

FIG. 4b schematically illustrates an implementation of this approach for the tail end of the queued sequence using the ring buffer metadata comprising the tail indicator 72 and the second reference indicator 68. For a system in which multiple independent actors interact with the ring buffer in parallel, a first producer and a second producer may each attempt to enqueue data items at the tail end of the queued sequence, wherein each producer performs an acquire process in order to acquire one or more slots of the ring buffer, the acquire process comprising an attempt to update the second reference indicator 68 provided for the producer tail based on an atomic operation (e.g. an atomic acquire operation for allowing each producer to atomically access the ring buffer metadata to acquire one or more slots). For example, a first producer (producer 1) may perform an acquire process to acquire slot f in the ring buffer by updating the second reference indicator 68 provided for the producer tail to point to slot f (this is represented in FIG. 4b by the first producer updating the second reference indicator 68 so that the arrow labelled 'A' points to slot f), and a second producer (producer 2) may perform an acquire process to acquire slot g in the ring buffer by updating the second reference indicator 68 provided for the producer tail to point to slot g (see arrow labelled 'B' in FIG. 4b which points to slot g). The provision of this second reference indicator 68, which is atomically accessed and updated (incremented) by the actors thus provides a mechanism for enabling actors, which become available, to acquire the slots in the ring buffer without conflict between the actors for any given slot. It should be noted that "incremented" is intended herein to mean a unit modification of a value and, by convention, this may be by addition (e.g. addition by one). However, an increase is not essential and this "incrementing" could equally well be chosen to be implemented by a decrease (e.g. subtraction by one).

In this way, each producer updates the second reference indicator 68 to acquire one or more slots in the ring buffer by modifying the value of the expected slot indicator according to the atomic operation, and when a producer successfully acquires one or more slots in the ring buffer an expected slot value is returned to the producer. Therefore, each producer that successfully acquires a slot in the ring buffer will have an expected slot value corresponding to the value of the expected slot indicator at the time when the producer acquired the slot. An expected slot value indicative of the location of slot f can be returned to a first producer when the first producer successfully acquires slot f, and another expected slot value indicative of the location of slot g can be returned to a second producer when the second producer successfully acquires slot g in the ring buffer. The first producer and second producer can concurrently write to acquired slot f and acquired slot g, respectively, and subsequently the first and second producer can each perform a release process comprising an attempt to update the tail indicator 72 provided for the consumer tail in order to release the acquired slots having the written data. Each producer will therefore attempt to release the slot acquired by that producer according to a comparison of the expected slot value for the producer with the current slot indicator of the tail indicator 72, and when the attempt by the producer to update the tail indicator 72 succeeds at least one of the current slot indicator and the pending slot indicator of the tail indicator 72 will be updated.

In some cases, the first producer may complete before the second producer and the first producer will attempt to update the tail indicator 72 in order to release the slot f before the second producer attempts to update the tail indicator 72 in order to release the slot g. In this case, the first producer will attempt to update the tail indicator 72 according to an atomic operation in which the first producer compares the expected slot value (the value returned to the first producer when updating the second reference indicator according to the atomic operation) with the current slot indicator of the tail indicator 72. When performing the release process, the first producer atomically accesses the tail indicator 72 and compares the expected slot value with the current slot indicator of the tail indicator 72. When the current slot indicator matches the expected slot value this indicates that the first producer is attempting to release the slot in-order with respect to the order of the queued sequence. As such, when the value of the current slot indicator matches the expected slot value, the release process atomically updates the current slot indicator of the tail indicator 72 provided for the consumer tail by modifying the value of the current slot indicator by a predetermined amount in order to indicate a location of slot f (this is represented by the arrow labelled 'C' that points to slot f). To support enqueueing and dequeueing of multiple slots by a process, a range comparison can be used for comparing the expected slot value with the current slot indicator. By updating the current slot indicator of the tail indicator 72 provided for the consumer tail in this way, the first producer releases its update. Similarly, when the second producer completes after the first producer has released the slot f by updating the tail indicator 72, the second producer will attempt to update the tail indicator 72 in order to release the slot g (this is represented by the arrow labelled 'D' that points to slot g), and will release the slot in-order with respect to the order of the queued sequence. It will be understood that this provides an example of a first producer and a second producer each acquiring a slot and each updating the current slot indicator of the tail indicator 72 to release updates in-order.

In some cases, the second producer may complete before the first producer and the second producer will attempt to update the tail indicator 72 in order to release the slot g before the first producer attempts to update the tail indicator 72 in order to release the slot f. This is an example of multiple producers interacting with the ring buffer and releasing their updates out-of-order with respect to the order of the queued sequence. In this case, the second producer will attempt to update the tail indicator 72 according to an atomic operation in which the second producer compares the expected slot value for the second producer with the current slot indicator of the tail indicator 72. When performing the release process, the second producer atomically accesses the tail indicator 72 and compares the expected slot value with the current slot indicator of the tail indicator 72. In this case, since the first producer has yet to release slot f and the second producer is therefore attempting to update the tail indicator 72 to release slot g out-of-order with respect to the order of the queued sequence, the value of the current slot indicator of the tail indicator 72 does not match the expected slot value for the second producer. When the current slot does not match the expected slot value, this indicates that the producer is attempting to release the slot out-of-order with respect to the order of the queued sequence, and the pending slot indicator of the tail indicator 72 is therefore updated by modifying a value of the pending slot indicator to indicate a presence and a location of a pending slot of the ring buffer without updating the current slot indicator. Specifically for the case where the second producer attempts to release its update before the first producer (i.e. releasing out-of-order), the second producer atomically accesses the tail indicator 72 and updates the pending slot indicator to indicate that the slot g is a pending slot. In this way, rather than having to wait for any earlier acquired slots to be released by other producers before releasing updates, the producers can release updates out-of-order by updating the pending slot indicator to indicate that there are slots in the ring buffer which already have been released by a producer. Effectively therefore, the pending slot indicator can be atomically updated by producers that release updates out-of-order and this allows such producers to be freed rather than having to wait for earlier producers.

This action of seeking to update the tail indicator 72 can be implemented in a variety of ways, but in some embodiments attempting to update the tail indicator 72 comprises an atomic compare-and-swap (CAS) operation which atomically: reads the value of the current slot indicator from the tail indicator 72, compares the value of the current slot indicator to the expected slot value for the actor by the actor executing the atomic operation, and depending on whether or not the values match this indicates whether or not the actor is attempting to release updates in-order or out-of-order. In addition to atomically reading the value of the current slot indicator, the value of the pending slot indicator can also be atomically read from the tail indicator 72 to provide an indication of whether there exist one or more pending updates based on a value associated with the pending slot indicator.

Following an out-of-order release by a producer which updates the pending slot indicator of the tail indicator 72, other producers in the system will release their updates by attempting to update the tail indicator 72 and will continue to further update the pending slot indicator when the current slot indicator of the tail indicator 72 does not match the expected slot value for the producer so as to indicate a presence and a location of additional pending slots. When a producer attempts to atomically update the tail indicator 72 and the current slot indicator matches the expected slot value for the producer, which indicates that the producer is attempting to release the slot in-order with respect to the order of the queued sequence, and the pending slot indicator indicates that there are one or more pending slots, this indicates that the ring buffer is in-order and there are one or more pending slots. In this case, one or more pending slots indicated by the pending slot indicator are identified and consecutive pending slots that are contiguous with the current slot can be released by updating the tail indicator 72 by modifying the value of the current slot indicator according to a number of consecutive pending slots indicated by the pending slot indicator as being contiguous with the current slot. In this way, the system making use of the ring buffer can identify when the system is in-order with pending updates, and the tail indicator 72 can be updated such that previous updates to the pending slot indicator are released which preserves the order of the sequence of data items. As such, multiple producers can execute in parallel to add data items to be processed to the queued sequence by performing concurrent enqueue operations and each producer can either update the current slot indicator or the pending slot indicator of the tail indicator 72 according to whether the producer is releasing in an in-order or an out-of-order manner. This technique allows updates to the current slot indicator to be controlled so that updates can be released out-of-order but the order in which data items are added to the queued sequence can be preserved.

Figure 4C:
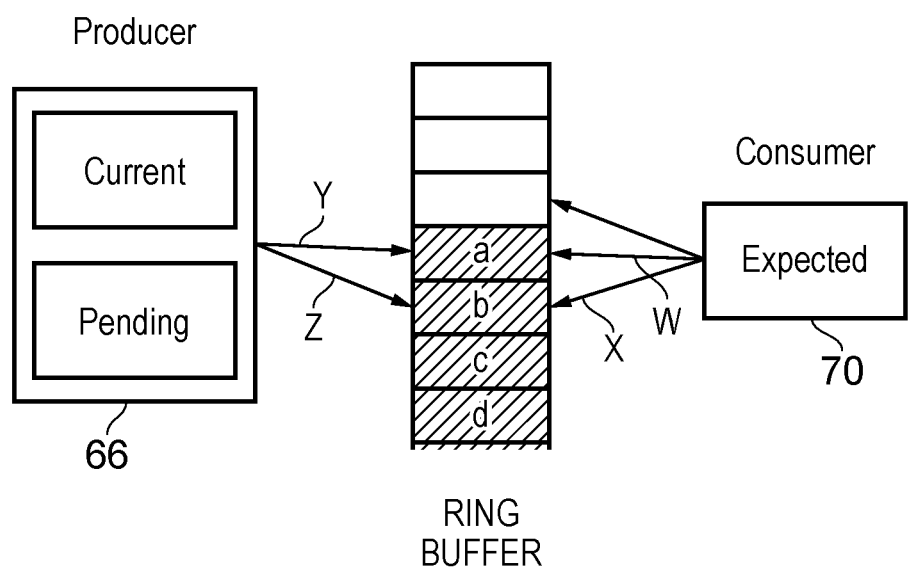
FIG. 4c illustrates ring buffer metadata for keeping track of a head end of a queued sequence of data items in accordance with embodiments of the present disclosure.

FIG. 4c schematically illustrates a similar implementation of this approach for the head end of the queued sequence using the ring buffer metadata comprising the head indicator (first reference indicator) 66 and the second reference indicator 70. For a system in which multiple independent actors interact with the ring buffer in parallel, a first consumer and a second consumer may each attempt to dequeue data items at the head end of the queued sequence, wherein each consumer performs an acquire process in order to acquire one or more slots of the ring buffer, the acquire process comprising an attempt to update the second reference indicator 70 provided for the consumer head based on an atomic operation (i.e. an atomic acquire operation for allowing each consumer to atomically access the ring buffer metadata to acquire one or more slots). For example, a first consumer (consumer 1) may perform an acquire process to acquire slot a in the ring buffer by updating the second reference indicator 68 provided for the producer tail to point to slot a (see arrow labelled 'W' in FIG. 4c), and a second consumer (consumer 2) may perform an acquire process to acquire slot b in the ring buffer by updating the second reference indicator 70 provided for the consumer head to point to slot b (see arrow labelled 'X' in FIG. 4c). The provision of this second reference indicator 70, which is atomically read and updated by the consumers thus provides a mechanism for enabling consumers, which become available, to acquire the slots in the ring buffer without conflict between the consumers for any given slot.

Each consumer can update the second reference indicator 70 to acquire one or more slots in the ring buffer and will have an expected slot value that is returned to the consumer when the consumer successfully acquires one or more slots in the ring buffer. The first consumer and second consumer can concurrently read data from acquired slot a and acquired slot b, respectively, and subsequently the first and second consumer can each perform a release process comprising an attempt to update the head indicator 66 provided for the producer head in order to release the acquired slots. Similar to the techniques mentioned above with reference to FIG. 4b concerning the tail end of the queued sequence, in some cases the first consumer may complete before the second consumer (i.e. in-order) or the first consumer may complete after the second consumer (i.e. out-of-order) and a given consumer can either update the current slot indicator or the pending slot indicator of the head indicator 66 according to whether the consumer is releasing in an in-order or an out-of-order manner so as to allow consumers to release their updates whilst preserving the ordering of the queued sequence. When releasing updates, the first consumer attempts to update the head indicator 66 according to an atomic operation in which the first consumer compares the expected slot value with the current slot indicator of the head indicator 66. By comparing the expected slot value with the current slot indicator the first consumer can identify whether the first consumer is in-order or out-of-order with respect to the order of the queued sequence. When the current slot indicator matches the expected slot value for the first consumer, the consumer release process atomically updates the current slot indicator of the head indicator 66 provided for the producer head by modifying the value of the current slot indicator to indicate a location of slot a (represented by the arrow labelled 'Y' that points to slot a). By updating the current slot indicator of the head indicator 66 provided for the producer head in this way, the first consumer releases its update to the ring buffer metadata. Similarly, when the second consumer completes after the first consumer has released the slot a by updating the head indicator 66, the second producer will attempt to update the head indicator 66 in order to release the slot b (this is represented by the arrow labelled 'Z' that points to slot b), and will therefore release the slot in-order with respect to the order of the queued sequence.

In some cases, the second consumer may complete before the first consumer, in which case the second consumer compares the expected slot value with the current slot indicator of the head indicator 66 and the compared values do not match, as the second consumer is attempting to update the head indicator 66 out-of-order. As such, the second consumer releases the update by updating the pending slot indicator of the head indicator 66 to indicate that slot b is a pending slot. Effectively therefore, the pending slot indicator can be atomically updated by consumers that release updates out-of-order and this allows such consumers to be freed rather than having to wait for earlier consumers to complete.

Figure 5:
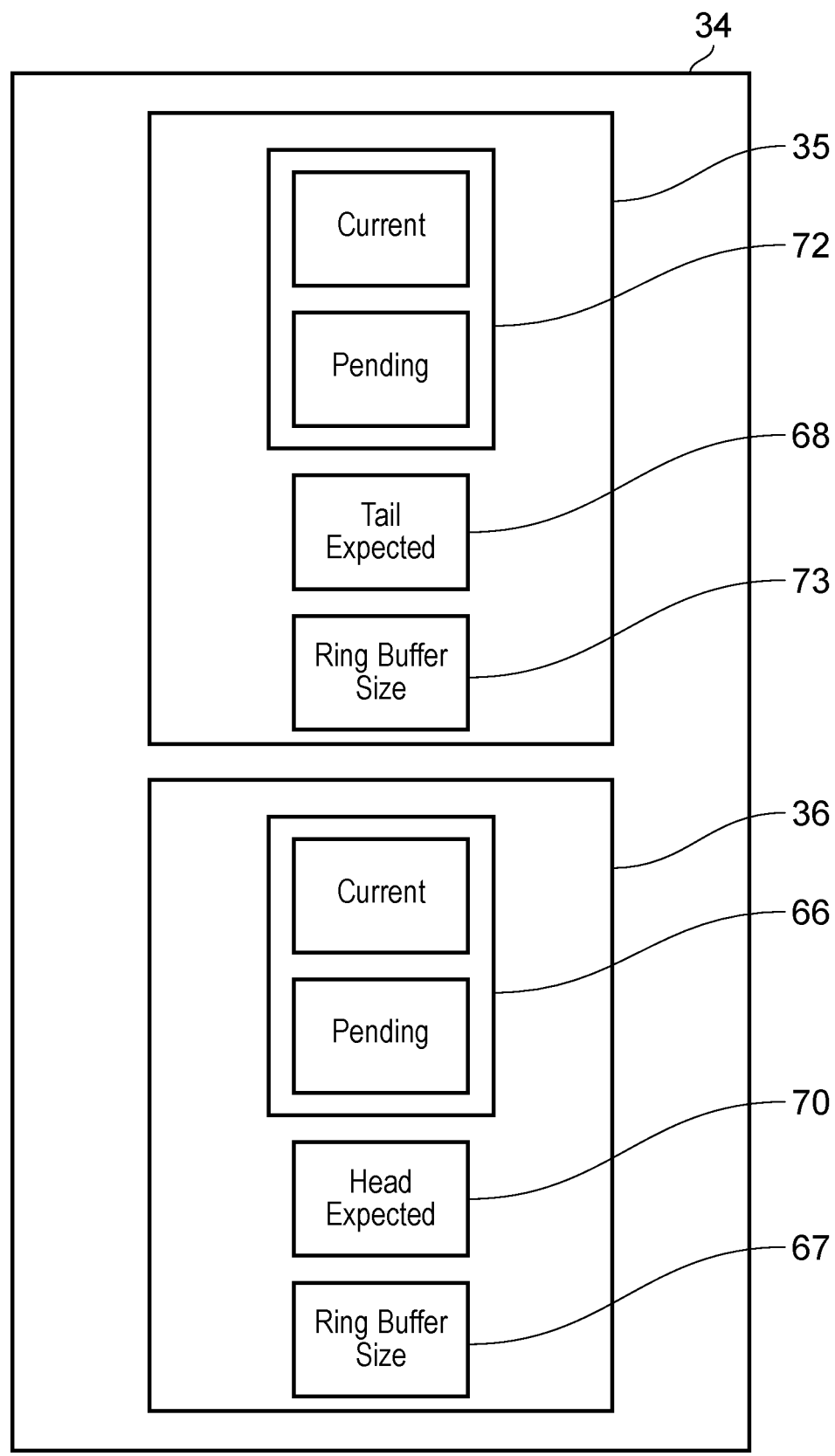
FIG. 5 illustrates ring buffer metadata in accordance with embodiments of the present disclosure.

FIG. 5 schematically illustrates the ring buffer metadata structure provided by the present techniques to support this approach. The ring buffer metadata storage 34 stores metadata comprising tail end metadata 35 and head end metadata 36 for keeping track of the tail end and the head end of the queued sequence, respectively, wherein the tail end metadata 35 and head end metadata 36 are atomically updated by the actors (e.g. threads) executing on the cores 12, 14. The tail end metadata 35 comprises the first reference indicator (tail indicator) 72, the second reference indicator 68 and a ring size indicator 73. Similarly, the head end metadata 36 comprises the first reference indicator (head indicator) 66, the second reference indicator 70 and a ring size indicator 67. Updates to the tail end metadata 35 by the producers allow the system to keep track of enqueue operations whilst updates to the head end metadata 36 by the consumers allow the system to keep track of dequeue operations. In some examples, the first reference indicator 66, 72 is a 64-bit scalar value comprising: 32-bits allocated to the current slot indicator; and 32-bits allocated to the pending slot indicator, and the second reference indicator 68, 70 may be a 32-bit scalar value while the ring size indicator 73, 67 may also be a 32-bit scalar value. It should be noted that other sizes are considered for the scalar values used to keep track of the ring buffer. For example, in some cases the first reference indicator 68, 70 may be represented by a scalar value comprising more than 64-bits and the pending slot indicator of the first reference indicator 68, 70 may be represented by a scalar value comprising more than 32-bits. It will be understood that the respective instances are stored as illustrated in FIG. 5 in a manner that enables atomic accesses to the respective indicators.

The ring buffer metadata comprises the ring size indicator 73 which may for example be a 32-bit scalar value indicating the size of the ring buffer according to a number of respective elements. A ring buffer having x elements can be used to implement a queued sequence of data items with a maximum of x−1 elements occupied at any one time, as there is always at least one empty slot in the ring buffer in order to distinguish between when the ring buffer is full and when the ring buffer is empty by distinguishing between the location of the head end and the tail end. Alternatively, a ring buffer having x elements can be used to implement a queued sequence of data items with a maximum of x elements occupied at any one time so long as an additional bit is provided to indicate whether or not the ring buffer is fully occupied. In some examples, the ring buffer has a number of elements given by $2^N$ (N is an integer) and each element has a storage location in the memory 22. The actors interact with the ring buffer to enqueue new data items at the tail end and to dequeue old data items at the head end, and the head pointers and tail pointers are updated in a manner such that the locations of the head end and tail end move around the ring buffer in a cyclic manner. By accessing the ring size indicator 73 as well as the head pointer and tail pointer stored in the ring buffer metadata storage 34 the number of occupied (non-empty) slots, and also therefore the number of unoccupied (empty) slots, in the ring buffer can be determined. As will be described later with reference to FIG. 7, the ring size indicator 73 can be accessed by the actors to ensure that occupied slots are not overwritten when performing an acquire process as part of an enqueue operation.

The pending slot indicator comprises a limit indicator, the limit indicator indicating a location of a furthest pending slot that is located furthest from the current slot in the ring buffer with respect to an order of the queued sequence. The pending slot indicator also comprises a change indicator, a change in the change indicator indicating a change in a number of pending slots between the current slot and the furthest pending slot. When an actor releases an update out-of-order the pending slot indicator is atomically updated by the actor to modify a value associated with the pending slot indicator. Modification of the value of the pending slot indicator comprises modification of at least one of the limit indicator and the change indicator. In the case where there are no pending slots, an actor that performs a release process to release an out-of-order update will attempt to atomically access the first reference indicator 66, 72 and when successful will update the limit indicator of the pending slot indicator to indicate a location of the pending slot with respect to the location of the current slot indicated by the current slot indicator. In other words, when the pending slot indicator indicates that there are no pending slots, an update to the pending slot indicator could modify the value of the limit indicator without updating the change indicator. Alternatively, the change indicator may be updated each time an actor releases an out-of-order update so that the change indicator is always updated in response to a release by an out-of-order actor.

In the case where there is a single pending slot, as indicated by the limit indicator of the pending slot indicator (as described in the previous paragraph), an actor that performs a release process to release an out-of-order update will attempt to atomically access the first reference indicator and will update the pending slot indicator by modifying the value of either the limit indicator or the change indicator depending on the location of the slot that the actor is attempting to release with respect to the location of the slot indicated by the limit indicator. If the actor is attempting to release a slot that is located further from the current slot than the location of the pending slot indicated by the limit indicator, then the actor will update the pending slot indicator by modifying the value of the limit indicator to indicate the location of the slot that the actor is attempting to release. If the actor is attempting to release a slot that is not located further from the current slot than the location of the pending slot indicated by the limit indicator (i.e. the actor is attempting to release a slot that is closer to the current slot than the pending slot indicated by the limit indicator), then the actor will update the pending slot indicator by modifying the value of the change indicator without updating the limit indicator. Therefore, the actor will update the change indicator to indicate that there exists a new pending slot between the current slot and the furthest pending slot from the current slot that is indicated by the limit indicator. It will be understood that the respective actors attempt to atomically access the first reference indicator to update the first reference indicator and the pending slot indicator is updated by modifying parts of the 64-bit value associated with the first reference indicator.

Figure 6:
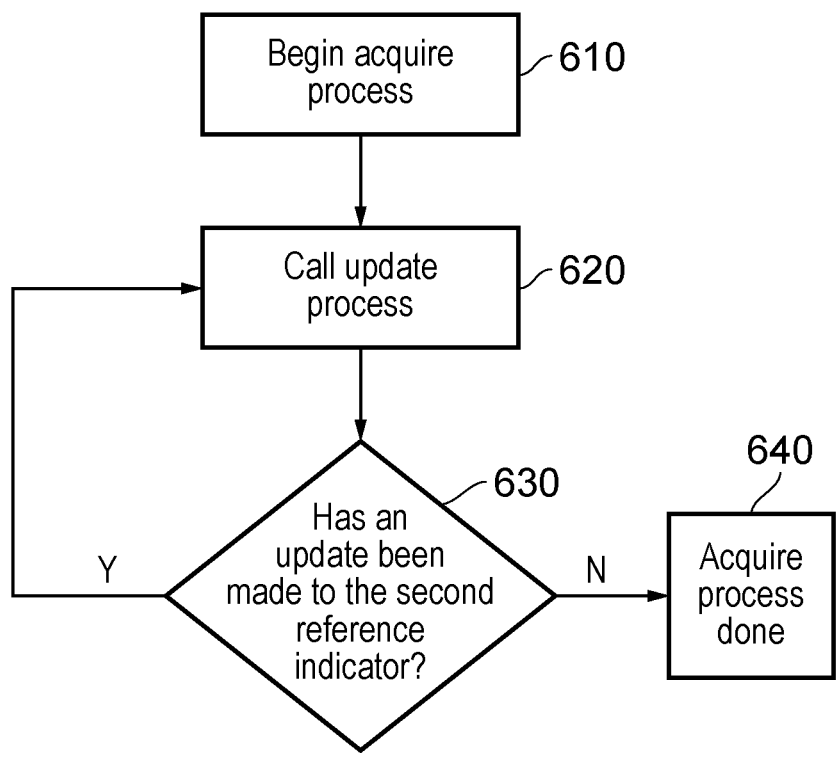
FIG. 6 illustrates a sequence of steps which are taken in the method of one embodiment when a system component performs an atomic acquire operation.

FIG. 6 shows an example sequence of steps which are taken in one embodiment when carrying out the atomic acquire process. The process begins at a step 610 where a process in the system wishes to acquire one or more slots in the ring buffer. At a step 620 the process calls the update process (to be described in more detail below with respect to FIG. 7) to attempt to atomically access the ring buffer metadata and update the ring buffer metadata. Specifically, the process attempts to atomically access the ring buffer metadata and update the second reference indicator. Then at a step 630 it is determined if an update has been made (by another process) whilst this local processing was going on. When it is determined that an update has been made (by another process), the flow returns to the step 620 and the update process is called again by the process to attempt to atomically access the ring buffer metadata and update the ring buffer metadata. When it is determined at the step 630 that no update has been made to the ring buffer metadata whilst this local processing was going on, then the flow proceeds to a step 640 where the acquire process is complete.

In embodiments of the present technique, the enqueue (producer) and dequeue (consumer) operations can acquire slots in the ring buffer by implementing an atomic acquire operation, where both consumers and producers can use a common atomic acquire operation to acquire slots in the ring buffer at the head end or tail end of the queued sequence. As such, an atomic operation for acquiring slots in the ring buffer can be used by both producers and consumers, where the difference between the enqueue acquire operation and the dequeue acquire operation is that the enqueue acquire operation requires knowledge of the ring size in order to acquire slots in the ring buffer whereas the dequeue acquire operation does not require knowledge of the ring size in order to acquire slots in the ring buffer. This difference between the enqueue acquire operation and dequeue acquire operation arises because the dequeue acquire operation can only dequeue slots that have been written to in the ring buffer (i.e. a dequeue should not be performed to acquire empty (non-occupied) slots in the ring buffer and should only be performed to acquire as many slots as are occupied in the ring buffer), whereas the enqueue acquire operation is performed to acquire empty slots in the ring buffer. In other words, determining the number of slots in the ring buffer that are eligible for acquisition for an enqueue operation requires a calculation in which the size of the ring buffer is determined (ring buffer size is obtained by accessing the ring buffer metadata, specifically the ring size indicator 67, 73 to determine the size of the ring buffer) and the difference between the location of the head end and the tail end is calculated in order to establish the location at which to acquire slots in the ring buffer without overwriting content before it should be read. As part of the enqueue acquire operation, the location of the head end and the tail end are obtained and the number of slots in the ring buffer eligible for acquisition (i.e. number of empty slots) can be determined based on the following calculation: number of eligible slots=ring_size−(tail location−head location). As such, the number of eligible slots can be determined for the enqueue acquire operation so that number of slots that can be acquired by an actor is limited to the number of currently unoccupied slots. As part of the dequeue acquire operation, the location of the head end and the tail end are obtained to determine the location and the number of occupied slots in the ring buffer. For the dequeue acquire operation the number of slots in the ring buffer eligible for acquisition can be determined based on the following calculation: number of eligible slots=tail location−head location.

Figure 7:
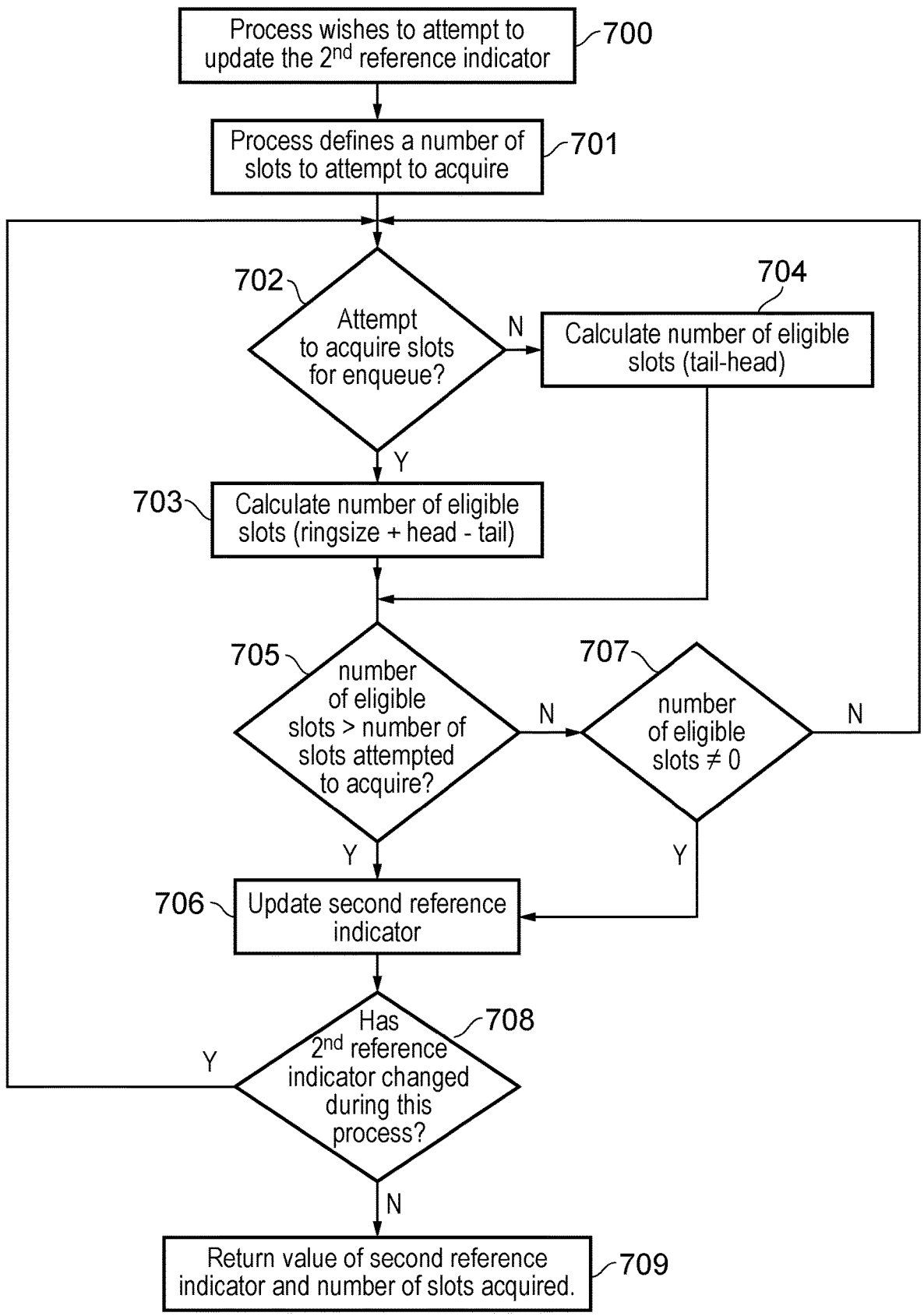
FIG. 7 illustrates a sequence of steps which are taken when a system component seeks to update a second reference indicator of the present techniques.

Consumers perform the dequeue acquire operation to attempt to atomically access and update the second reference indicator 70 provided for the head end of the queued sequence (consumer) to acquire one or more slots at the head end of the queued sequence. Similarly, producers perform the enqueue acquire operation to attempt to atomically access and update the second reference indicator 68 provided for the tail end of the queued sequence to acquire one or more slots at the tail end of the queued sequence. FIG. 7 shows a sequence of steps which are taken in one embodiment when carrying out the atomic acquire process, specifically (as the first step 700 shows) when a process wishes to attempt to update the second reference indicator provided for the head end (consumer) or the tail end (producer). In this case, a slot location indicator for the tail end of the queued sequence which is updated by producers to indicate a location of the tail end is one example of the second reference indicator, and a slot location indicator for the head end of the queued sequence which is updated by consumers to indicate a location of the head end is another example of the second reference indicator. At a step 701 a number of slots to be acquired is determined by the process and the process attempts to acquire the number of slots in the ring buffer by atomically accessing and updating the ring buffer metadata. At a step 702 it is determined whether the process is attempting to acquire slots for enqueueing (i.e. at the tail end of the queued sequence) or for dequeueing (i.e. at the head end of the queued sequence). When it is determined at the step 702 that the process is attempting to acquire slots for enqueueing, the flow proceeds to a step 703 where a number of slots eligible for acquisition for enqueueing is calculated based on the ring size (or capacity of the ring buffer), the location of the head and the location of the tail. The number of occupied slots in the ring buffer is given by tail-head, and therefore at the step 703 the calculation ringsize-(tail-head) is used to calculate the number of slots eligible for acquisition for enqueueing. When it is determined at the step 702 that the process is attempting to acquire slots for dequeueing, the flow proceeds to a step 704 where a number of slots eligible for acquisition for dequeueing is calculated based on the location of the head and the location of the tail using the calculation tail-head. At a step 705 the calculated number of eligible slots is compared with the number of slots that the process is attempting to acquire. When it is determined at the step 705 that the number of eligible slots is greater than the number of slots that the process is attempting to acquire, the flow proceeds to a step 706 where the second reference indicator is updated to reflect that one or more slots have been acquired by the process. When it is determined at the step 705 that the number of eligible slots is less than the number of slots that the process is attempting to acquire, the flow proceeds to a step 707 where it is determined whether the number of eligible slots is equal to zero, in which case it is not possible for the process to acquire any slots in the ring buffer. When it is determined at the step 707 that the number of eligible slots is equal to zero, the flow returns to the step 702 to reattempt to acquire slots or optionally a value may be returned to the process indicating that no slots have been acquired and the process can make a decision whether or not to retry the acquire operation starting at the step 700. When it is determined at the step 707 that the number of slots is not equal to zero, the flow proceeds to the step 706 to update the second reference indicator. In this way, when the number of eligible slots in the ring buffer is less than the number of slots that the process is attempting to acquire, the process can acquire a number of slots in the ring buffer even though the process is unable to acquire all of the slots that it attempted to acquire. Alternatively, when the process is unable to acquire the total number of slots requested for acquisition the flow may return to the step 702. Once the process updates the second reference indicator at the step 706 according to the number of slots to be acquired in the ring buffer, the flow proceeds to a step 708 where it is determined whether the second reference indicator has been changed whilst this process was being carried out. At the step 708, when it is determined that the second reference indicator has been changed during this processing, the flow returns to the step 702 such that the update to the second reference indicator is not completed and thus fails, and the process reattempts to update the second reference indicator (i.e. when the second reference indicator has been changed by another process during the time that this processing was being carried out then the attempt to acquire the slots fails). As such, the process will continue to attempt to update the second reference indicator until it is determined at the step 708 that the second reference indicator has not been changed during this processing. When it is determined at the step 708 that the second reference indicator has not been changed during this processing, the flow proceeds to the step 709 so that the second reference indicator is atomically updated and the expected slot value indicative of the original value of the second reference indicator and a value indicating the number of slots acquired by the process is returned to the process. As such, at the step 709 two values are returned to the process, the first value corresponding to the value of the second reference indicator at the time when the process acquired the one or more slots and therefore indicating a location of a first slot in the ring buffer that can be used by the process to write to (enqueue) or read from (dequeue), and the second value indicating a number of slots acquired due to the atomic acquire operation. This means that the values returned to the process can be used by the process to determine where in the ring buffer to perform the enqueue or dequeue operations, and the value indicating the number of slots acquired by the process can be used to determine whether the process acquired all or some of the slots that the process attempted to acquire.

Figure 8:
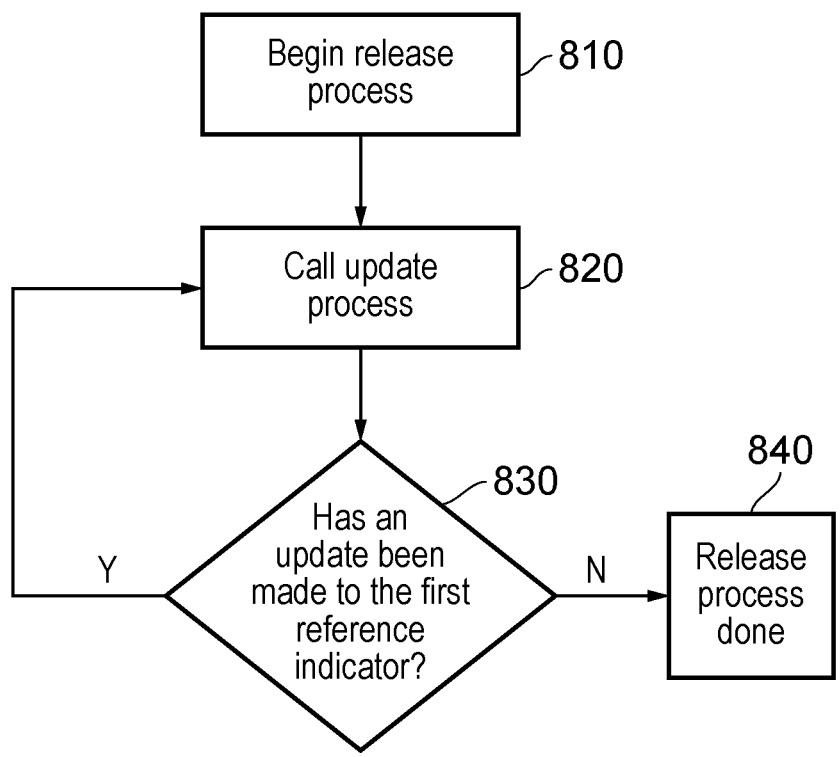
FIG. 8 illustrates a sequence of steps which are taken in the method of one embodiment when a system component performs an atomic release operation.

FIG. 8 shows an example sequence of steps which are taken in one embodiment when carrying out the non-blocking release process. The process begins at a step 810 where a process in the system wishes to release one or more slots. At a step 820 the process calls the update process (to be described in more detail below with respect to FIG. 9) to attempt to atomically access the ring buffer metadata and update the ring buffer metadata. Specifically, the process attempts to atomically access the ring buffer metadata and update the first reference indicator according to an expected slot value (as discussed previously in relation to FIGS. 6 and 7) returned to the process when the process acquired the one or more slots. This attempt by the process to update the first reference indicator is the "critical section", being critical in the sense that it must be performed atomically because it is possible that different processes are attempting to atomically access and update the first reference indicator at the same time. Therefore, the operations performed in this "critical section" can be implemented using a compare-and-swap (CAS) operation such that processes can atomically access and update the ring buffer metadata and another process may be temporarily blocked from releasing its update by another process when the processes are both attempting to update the first reference indicator concurrently. In other words, processes can atomically access and update the ring buffer metadata and one process may have to retry releasing its update if another process is concurrently attempting to update the first reference indicator. This can mean that one process can be blocked by another process, however, each process is limited to a short interaction in this "critical section" and the blocking of one process by another process during this section does not represent a significant time constraint. At a step 830 it is determined whether an update has been made (by another process) whilst this local processing was going on. When it is determined that an update has been made (by another process), the flow returns to the step 820 and the update process is called again by the process to attempt to atomically access the ring buffer metadata and update the ring buffer metadata. When it is determined at the step 830 that no update has been made to the ring buffer metadata whilst this local processing was going on, then the flow proceeds to a step 840 where the release process is complete.

Figure 9:
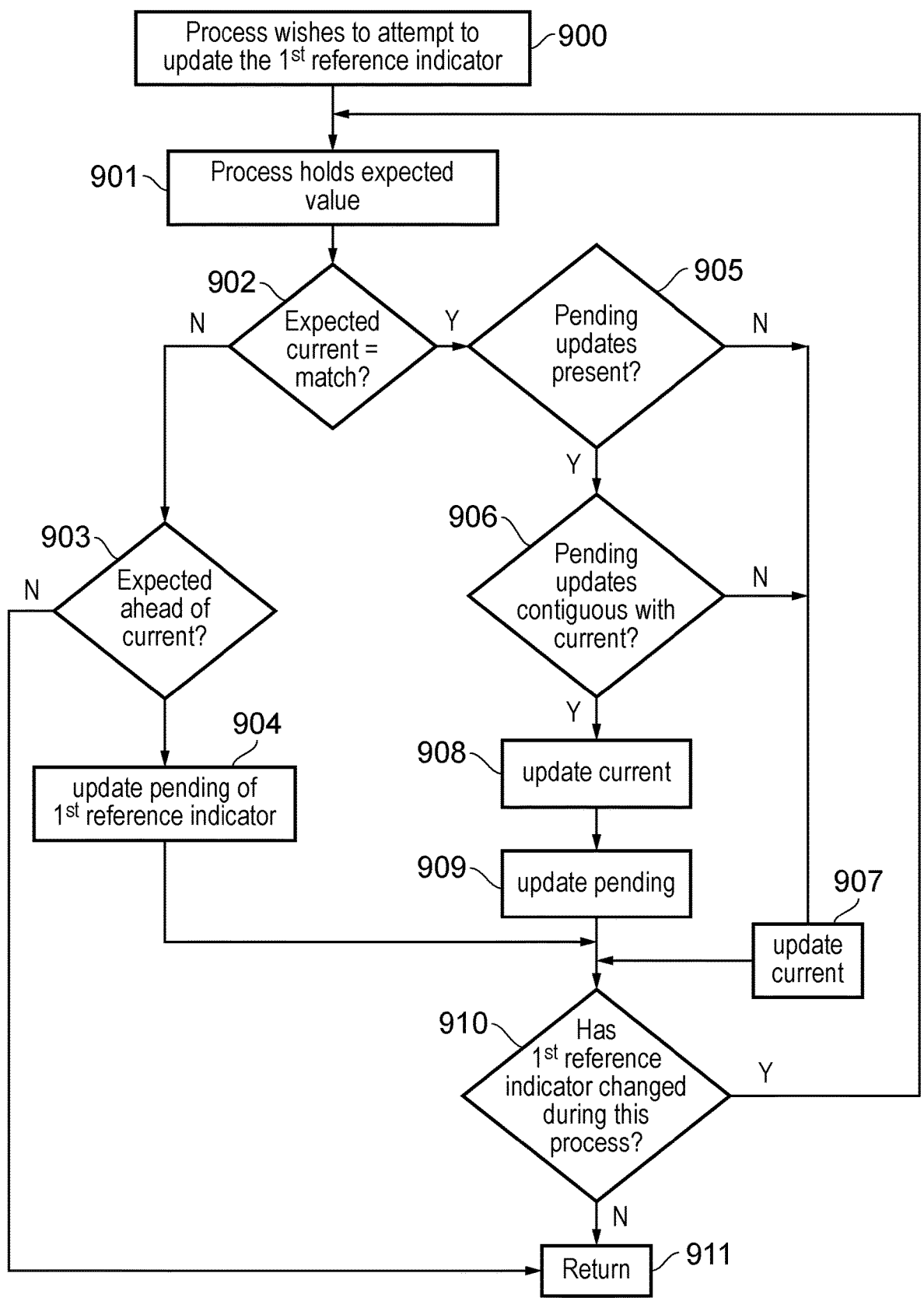
FIG. 9 illustrates a sequence of steps which are taken when a system component seeks to update a first reference indicator of the present techniques.

FIG. 9 shows a sequence of steps which are taken in one embodiment when carrying out the atomic release process, specifically (as the first step 900 shows) when a process wishes to attempt to update the first reference indicator. In this case, the first reference indicator provides: an indication of a location of a current slot of the ring buffer; an indication as to whether there are one or more updates that have been released out-of-order by an actor that interacts with the ring buffer; and an indication of a location of one or more pending slots in the ring buffer corresponding to the one or more updates released out-of-order by the actor that interacts with the ring buffer. Hence, a head indicator or a tail indicator which indicates a location of a current slot and also indicates a presence and a location of one or more pending slots of the queued sequence is an example of the first reference indicator which can be updated by actors that release updates in-order or out-of-order with respect to the order of the queued sequence of data items. The head indicator or tail indicator, which is an example of the first reference indicator, comprises three respective indicators: the current slot indicator, the change indicator and the limit indicator. As such, a process that wishes to attempt to update the head indicator or tail indicator will attempt to update at least one of the current slot indicator, change indicator and limit indicator according to the processing illustrated in FIG. 9.

When a process has completed the writing or reading phase of the enqueue or dequeue operation, the process begins the release process and thus wishes to attempt to update the first reference indicator at the step 900. At a step 901 an expected slot value returned to the process when the process acquired one or more slots, is held by the process for comparison with the ring buffer metadata. At a step 902 it is determined whether the expected slot value held by the process matches the value of the current slot indicator of the first reference indicator. As discussed, this attempt to update the ring buffer metadata can be implemented based on an atomic compare-and-swap (CAS) operation. When the expected slot value does not match the value of the current slot indicator, which indicates that the process is attempting to release an update out-of-order with respect to the ordered sequence of data items (i.e. the process is releasing updates either 'ahead' or 'behind' with respect to the order of the queued sequence of data items), the flow proceeds to a step 903 where it is determined whether or not the process is attempting to release updates in a manner that is 'ahead' of the ordered sequence of data items. At the step 903, the expected slot value is compared to the value of the current slot indicator and when the expected slot value indicates a slot that is not ahead (i.e. not ahead and does not match the current value, and therefore must be 'behind') of the slot location indicated by the current slot indicator, then the flow proceeds to a step 911 without updating the ring buffer metadata. At the step 911 a value is returned to the process to indicate that the process has completed the release non-blocking process. In this way, a value can be returned to the process when the process is attempting to release updates 'behind' with respect to the order of the queued sequence and in this case the process can complete the non-blocking release process without updating the first reference indicator.

When it is determined at the step 903 that the expected slot value indicates a slot that is ahead of the slot location indicated by the current value, then the flow proceeds to a step 904 where the pending slot indicator of the first reference indicator is updated by the process to indicate a presence and a location of one or more pending slots corresponding to the updates that the process is attempting to release. It will be understood that the process will update at least one of the limit indicator and the change indicator of the pending slot indicator at the step 903 depending on the location indicated by the expected slot value with respect to the location indicated by the value of the current slot indicator and also depending on whether one or more pending slots are already presently indicated by the pending slot indicator, in the manner described previously. Once the process updates the pending slot indicator at the step 904, the flow proceeds to a step 910 where it is determined whether the first reference indicator has been changed whilst this process was being carried out (i.e. if the current slot indicator or the pending slot indicator of the first reference indicator has been changed during the time that this processing was being carried out). At the step 910, when it is determined that the first reference indicator has been changed during this processing, the flow returns to the step 901 such that the update to the first reference indicator fails (the update to the pending slot indicator at the step 904 is not completed and thus fails) and the process reattempts to update the first reference indicator. As such, the process will continue to attempt to update the first reference indicator until a value is returned at the step 911. When it is determined at the step 910 that the first reference indicator has not been changed during this processing, the flow proceeds to the step 911 so that the first reference indicator is atomically updated and the value is returned to the process at the step 911 indicating that the process has completed the release non-blocking process.

Referring again to the step 902, when it is determined that the expected slot value does match the value of the current slot indicator, which indicates that the process is attempting to release an update in-order with respect to the ordered sequence of data items, the flow then proceeds to a step 905, where the process determines whether the pending slot indicator indicates whether there are one or more pending slots in the ring buffer. When it is determined, at the step 905, that there are no pending slots the flow proceeds to a step 907 where the process updates the current slot indicator to modify the value of the current slot indicator according to the expected value. When the current slot indicator has been updated at the step 907 the flow proceeds to the step 910 where it is determined whether the first reference indicator has been changed whilst this process was being carried out, and when it is determined that the first reference indicator has been changed during the time that this processing was carried out, the flow returns to the step 901 such that the update to the first reference indicator fails (i.e. the update to the current slot indicator at the step 907 is not completed and thus fails). When it is determined at the step 905 that the pending slot indicator indicates a presence of one or more pending slots, the flow proceeds to a step 906 where it is determined whether any of the one or more pending slots are contiguous with the slot indicated by the current value. This can be achieved by using the pending slot indicator to scan for pending slots located between the current slot and the furthest pending slot indicated by the limit indicator. An in-order process can perform a scan for pending slots located between the current slot and the furthest pending slots. In some examples, when the value of the change indicator changes during the scan this indicates that the number of pending slots between the current slot and the furthest pending slot has changed, and therefore the process can re-scan the ring buffer between the current slot and the furthest pending slot to identify whethe there are pending slots that can be released in-order. When one or more pending slots are present, none of which are contiguous with the slot indicated by the current value, the flow proceeds to the step 907 where the current slot indicator is updated. However, when it is determined at the step 906 that one or more of the pending slots are contiguous with the slot indicated by the current value, the flow proceeds to a step 908 where the value of the current slot indicator is updated by the process. It will be understood that the value of the current slot indicator is updated at the step 908 according to a number of consecutive pending slots determined to be contiguous with the current slot, as discussed previously. When the current slot indicator is updated at the step 908, the flow proceeds to a step 909 where the pending slot indicator is updated in accordance with the updates made to the current slot indicator at the step 908. As such, at the step 909 the pending slot indicator is updated to indicate a presence and a location of one or more pending slots in the ring buffer after the current slot indicator has been updated at the step 908. In this way, the pending slot indicator can be updated at the step 909 so that one or more pending slots determined at the step 908 not to be contiguous with the slot indicated by the current value can be indicated by the pending slot indicator. In the case where all of the pending slots are determined, at the step 906, to be contiguous with the slot indicated by the current value, the update to the pending slot indicator 909 may be such that the pending slot indicator is updated to indicate that no pending slots are present. When the pending slot indicator has been updated at the step 909, the flow proceeds to a step 910 where it is determined, using an atomic compare-and-swap (CAS) operation for example, whether the first reference indicator has been changed whilst this process was being carried out. When it is determined at the step 910 that the first reference indicator has been changed during this processing, the flow returns to the step 901 such that the update to the first reference indicator fails and the process reattempts to update the first reference indicator. When it is determined at the step 910 that the first reference indicator has not been changed during this processing, the flow proceeds to the step 911 and a value is returned to the process indicating that the process has completed the non-blocking release process.

FIG. 10 schematically illustrates a data processing apparatus 100 which may embody various examples of the present techniques. The apparatus comprises data processing circuitry 120 which performs data processing operations on data items in response to a sequence of instructions which it executes. For example, the data processing circuitry 120 may comprise the cores 12 and 14 shown in FIG. 1, on which the threads T0, T1, T2 and T3 execute. The instructions are retrieved from the memory 140 to which the data processing circuitry 120 has access and, in a manner with which one of ordinary skill in the art will be familiar, fetch circuitry 160 is provided for this purpose. Note that the memory 140 to which the data processing apparatus has access may comprise the ring buffer storage 32 and ring buffer metadata storage 34 shown in FIG. 1 and FIG. 5. Furthermore, instructions retrieved by the fetch circuitry 160 are passed to the instruction decoder circuitry 180, which generates control signals which are arranged to control various aspects of the configuration and operation of the processing circuitry 120, as well as of a set of registers 200 and a load/store unit 220. Generally, the data processing circuitry 120 may be arranged in a pipelined fashion, yet the specifics thereof are not relevant to the present techniques. One of ordinary skill in the art will be familiar with the general configuration which FIG. 10 represents and further detailed description thereof is dispensed herewith merely for the purposes of brevity. The registers 200, as can be seen in FIG. 10, each comprise storage for multiple data elements, such that the processing circuitry 120 can apply data processing operations either to a specified data element within a specified register, or can apply data processing operations to a specified group of data elements (a "vector") within a specified register.

Data values required by the data processing circuitry 120 in the execution of the instructions, and data values generated as a result of those data processing instructions, are written to and read from the memory 140 by means of the load/store unit 220. Note also that generally the memory 140 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such as in RAM, in ROM, via a network interface, and so on. The present disclosure provides instructions which the processing circuitry 120 can execute to atomically access and update the ring buffer metadata 34, as illustrated in FIG. 5. In this way, the actors in the system can execute the instructions to access the metadata 34 comprising the tail end metadata 35 and the head end metadata 36 for keeping track of the tail end and the head end of the queued sequence. Instructions are provided which can be executed by the actors to atomically acquire slots in the ring buffer and to atomically release slots in the ring buffer.

Thus the present techniques provide ring buffer acquire instructions, and these instructions may form part of the sequence of instructions which are retrieved from the memory 140 and executed by the processing circuitry 120 as described above. Thus it will be understood that in such an example the above-described actors are embodied as processes executing in the processing circuitry 120 and they may make use of the defined ring buffer acquire instructions in order to perform atomic acquire operations to acquire one or more slots in the ring buffer by atomically accessing and updating the ring buffer metadata 34.

The ring buffer acquire instructions may, as in the example below, comprise three variants of a ring buffer acquire instruction: acquire ordering (A); release ordering (L); and acquire and release ordering (AL). These variants may thus be represented as:

$$RBACQ[E,D]\{A,L,AL\}<Xs>,<Wt>,[<Xn|SP>],$$

where E indicates that the instruction is for enqueueing and D indicates that the instruction is for dequeueing. In these examples the registers specified in the instructions are:

\<Wt\>—a 32-bit general register with the requested number of items encoded in the target register field.

\<Xs\>—a 64-bit general register to be loaded with the resulting starting index and the actual number of items encoded in the source register field.

\<Xn|SP\>—a 64-bit base register or SP, encoded in the additional register field.

Thus the 32-bit general register \<Wt\> specifies a number of slots requested by an actor for acquisition. The 64-bit general register \<Xs\> is loaded with a starting index for the ring buffer and a number of slots acquired by the actor. Note that the 32-bit general register \<Wt\>, the 64-bit general register \<Xs\> and the 64-bit base register \<Xn|SP\> are obligatory parameters for the ring buffer acquire instructions.

Similarly the present disclosure provides ring buffer release instructions and these instructions may also form part of the sequence of instructions which are retrieved from the memory 140 and executed by the processing circuitry 120 as described above. Thus it will be understood that in such an example the above-described actors are embodied as processes executing in the processing circuitry 120 and they may make use of the defined ring buffer release instructions in order to perform atomic acquire operations to release one or more slots in the ring buffer by atomically accessing and updating the ring buffer metadata 34.

The ring buffer release instructions may, for example, comprise three variants of a ring buffer acquire instruction: acquire ordering (A); release ordering (L); and acquire and release ordering (AL). These variants may thus be represented as:

$$RBREL\{A,L,AL\}<Xs>,<Xt>,[<Xn|SP>].$$

In these examples the registers specified in the instructions are:

\<Xt\>—a 64-bit general register with the starting index and the number of items to release encoded in the source register field.

\<Xs\>—a 64-bit general register to be loaded with the old value of current:pending \<Xn|SP\>—a 64-bit base register or SP, encoded in the additional register field.

Hence the 64-bit general register \<Xt\> specifies a starting index for the ring buffer and a number of slots to be released by an actor. The 64-bit general register \<Xs\> is loaded with the expected value of the expected slot indicator. The 64-bit general registers \<Xt\>, \<Xs\> and \<Xn|SP\> are obligatory parameters for the ring buffer release instruction set.

Accordingly it will be understood that, in a system which supports the above described ring buffer acquire and ring buffer release instructions, the decode circuitry (such as item 180 in the example of FIG. 10) is configured to recognise these instructions and to assert appropriate control signals (for example for the processing circuitry 100, the registers 200 and the load/store unit 220 in the example of FIG. 10) to cause the above-described acquire and release processes to be carried out.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 which is the same as the application program interface of the hardware architecture being modelled by the simulator program 710. Thus, the program instructions of the target code 700, including the above-described ring buffer acquire and ring buffer release instructions, may be executed from within the instruction execution environment using the simulator program 710, so that a host computer 730 which does not actually have the hardware features of the apparatus discussed above can emulate these features.

In brief overall summary apparatuses, methods, programs, and ring buffer acquire and release instructions are provided. Ring buffer storage circuitry is disclosed which stores a ring buffer comprising multiple slots to hold a queued sequence of data items. Data processing circuitry executes a plurality of processes to add one or more data items to be processed to the queued sequence and to remove one or more data items for processing from the queued sequence. Each process is arranged to perform an acquire process to acquire at least one slot in the ring buffer and to subsequently perform a release process to release the at least one slot. Ring buffer metadata storage circuitry stores metadata for the ring buffer comprising a first reference indicator and a second reference indicator. The first reference indicator comprises a current slot indicator indicative of a location of a current slot and a pending slot indicator indicative of a presence and a location of one or more pending slots of the multiple slots of the ring buffer. The second reference indicator comprises an expected slot indicator indicative of an expected location of the current slot, the one or more pending slots having been acquired after the current slot, a process having an expected slot value indicative of a value of the expected slot indicator when the process performs the acquire process to acquire the at least one slot in the ring buffer. The release process comprises an attempt to update the first reference indicator for the ring buffer comprising an atomic operation in which the expected slot value for the process is compared with the current slot indicator. When the current slot indicator matches the expected slot value at least the current slot indicator is updated by modifying a value of the current slot indicator by a predetermined value. When the current slot indicator does not match the expected slot value the pending slot indicator is updated by modifying a value of the pending slot indicator to indicate the presence and the location of one or more pending slots of the ring buffer without updating the current slot indicator.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
    ring buffer storage circuitry to store a ring buffer comprising multiple slots to hold a queued sequence of data items;
    data processing circuitry to execute a plurality of processes to add one or more data items to be processed to the queued sequence and to remove one or more data items for processing from the queued sequence, wherein each process is arranged to perform an acquire process to acquire at least one slot in the ring buffer and to subsequently perform a release process to release the at least one slot; and
    ring buffer metadata storage circuitry to store metadata for the ring buffer comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein
    the release process comprises an attempt to update the first reference indicator for the ring buffer comprising an atomic operation in which the expected slot value for the process is compared with the current slot indicator, and
    when the current slot indicator matches the expected slot value at least the current slot indicator is updated by modifying a value of the current slot indicator by a predetermined value, and
    when the current slot indicator does not match the expected slot value the pending slot indicator is updated by modifying a value of the pending slot indicator to indicate the presence and the location of one or more pending slots of the ring buffer without updating the current slot indicator.

2. The apparatus as claimed in claim 1, wherein when the current slot indicator does not match the expected slot value, and the expected slot value indicates an expected location of the current slot that is not located after the current slot indicated by the current slot indicator, with respect to an order of the queued sequence, the first reference indicator is not updated.

3. The apparatus as claimed in claim 1, wherein when the current slot indicator does not match the expected slot value, the pending slot indicator is updated by modifying the value of the pending slot indicator to indicate the presence and the location of one or more pending slots in the ring buffer with respect to the current slot indicated by the current slot indicator.

4. The apparatus as claimed in claim 1, wherein the pending slot indicator comprises a limit indicator, the limit indicator indicating a location of a furthest pending slot that is located furthest from the current slot in the ring buffer with respect to an order of the queued sequence.

5. The apparatus as claimed in claim 4, wherein the pending slot indicator comprises a change indicator, a change in the change indicator indicating a change in a number of pending slots between the current slot and the furthest pending slot.

6. The apparatus as claimed in claim 5, wherein the pending slot indicator is updated by modifying at least one of the limit indicator and the change indicator when the current slot indicator does not match the expected slot value.

7. The apparatus as claimed in claim 6, wherein when the expected slot value indicates a slot that is located further from the current slot in the ring buffer than the furthest pending slot indicated by the limit indicator, with respect to an order of the queued sequence, the limit indicator is updated.

8. The apparatus as claimed in claim 7, wherein the limit indicator is updated based on the expected slot value to indicate a different location for the furthest pending slot.

9. The apparatus as claimed in claim 5, wherein when the expected slot value indicates a slot that is located between the current slot and the furthest pending slot the change indicator is updated without updating the limit indicator.

10. The apparatus as claimed in claim 1, wherein when the current slot indicator matches the expected slot value and the pending slot indicator indicates the presence of one or more pending slots of the ring buffer, the current slot indicator is updated by modifying the value of the current slot indicator according to a number of consecutive pending slots contiguous with the current slot.

11. The apparatus as claimed in claim 10, wherein the value of the current slot indicator is modified to indicate a furthest pending slot of the one or more consecutive pending slots, and wherein the furthest pending slot is the pending slot of the one or more consecutive pending slots that is located furthest from the current slot in the ring buffer.

12. The apparatus as claimed in claim 1, wherein the current slot indicator is indicative of the location of the current slot at either a head end or a tail end of the queued sequence of data items and the expected slot indicator is indicative of the expected location of the current slot at the same end of the queued sequence of data items.

13. The apparatus as claimed in claim 1, wherein the first reference indicator is a tail indicator for the tail end of the queued sequence of data items for the processes that remove data items from the queued sequence and the second reference indicator is a tail indicator for the tail end of the queued sequence of data items for the processes that add data items to the queued sequence.

14. The apparatus as claimed in claim 13, wherein the processes that add data items to the queued sequence are arranged to perform the acquire process to acquire at least a next unoccupied slot in the ring buffer, the acquire process comprising an attempt to update the second reference indicator according to an atomic operation.

15. The apparatus as claimed in claim 13, wherein the data processing circuitry is arranged to execute the processes that add data items to the queued sequence in parallel, and each process concurrently attempts to update the first reference indicator according to the atomic operation.

16. The apparatus as claimed in claim 1, wherein the first reference indicator is a head indicator for the head end of the queued sequence of data items for the processes that add data items to the queued sequence and the second reference indicator is a head indicator for the head end of the queued sequence of data items for the processes that remove data items from the queued sequence.

17. The apparatus as claimed in claim 16, wherein the processes that remove data items from the queued sequence are arranged to perform the acquire process to acquire at least a next occupied slot in the ring buffer, the acquire process comprising an attempt to update the second reference indicator according to an atomic operation.

18. The apparatus as claimed in claim 16, wherein the data processing circuitry is arranged to execute the processes that remove data items from the queued sequence in parallel, and each process concurrently attempts to update the first reference indicator according to the atomic operation.

19. The apparatus as claimed in claim 1, wherein when the process performs the acquire process to acquire the at least one slot in the ring buffer the second reference indicator is updated by modifying the value of the expected slot indicator according to a number of slots acquired by one of the processes.

20. A method of operating data processing apparatus comprising the steps of:
allocating storage for a ring buffer comprising multiple slots to hold a queued sequence of data items;
executing a plurality of processes to add one or more data items to be processed to the queued sequence and to remove one or more data items for processing from the queued sequence, wherein an acquire process is performed to acquire at least one slot in the ring buffer and a release process is subsequently performed to release the at least one slot;
allocating storage for metadata for the ring buffer, the metadata comprising a first reference indicator and a second reference indicator, the first reference indicator comprising a current slot indicator indicative of a location of a current slot and a pending slot indicator indicative of a presence and a location of one or more pending slots of the multiple slots of the ring buffer, and the second reference indicator comprising an expected slot indicator indicative of an expected location of the current slot, the one or more pending slots having been acquired after the current slot, wherein an expected slot value is a value of the expected slot indicator when the process performs the acquire process to acquire the at least one slot in the ring buffer, wherein
the release process comprises attempting to update the first reference indicator for the ring buffer comprising an atomic operation in which the expected slot value for the process is compared with the current slot indicator, and
when the current slot indicator matches the expected slot value at least the current slot indicator is updated by modifying a value of the current slot indicator by a predetermined value, and
when the current slot indicator does not match the expected slot value the pending slot indicator is updated by modifying a value of the pending slot indicator to indicate the presence and the location of one or more pending slots of the ring buffer without updating the current slot indicator.

* * * * *